US008825435B2

(12) United States Patent
Smid et al.

(10) Patent No.: US 8,825,435 B2
(45) Date of Patent: Sep. 2, 2014

(54) INTERTIAL TRACKING SYSTEM WITH PROVISION FOR POSITION CORRECTION

(75) Inventors: G. Edzko Smid, Oxford, MI (US); Thomas P. Stiglich, Shelby Township, MI (US)

(73) Assignee: iTrack, LLC, Rochester, MI (US)

( * ) Notice: Subject to any disclaimer, the term of this patent is extended or adjusted under 35 U.S.C. 154(b) by 76 days.

(21) Appl. No.: 13/031,933

(22) Filed: Feb. 22, 2011

(65) Prior Publication Data

US 2011/0313716 A1 Dec. 22, 2011

Related U.S. Application Data

(60) Provisional application No. 61/306,132, filed on Feb. 19, 2010.

(51) Int. Cl.
*G06F 15/00* (2006.01)
*G01P 15/08* (2006.01)

(52) U.S. Cl.
USPC ........................................... 702/141; 73/488

(58) Field of Classification Search
CPC ..... G01P 15/00; G01P 11/02; G01P 2015/02; G01P 2015/08; G01P 2015/00; G01C 22/006; A61B 5/1118; G06F 17/00
USPC ............. 702/85, 150, 155, 94, 141, 101, 151; 701/517, 519; 73/488; 342/165; 74/1.37, 488
See application file for complete search history.

(56) References Cited

U.S. PATENT DOCUMENTS

| 6,176,837 B1 * | 1/2001 | Foxlin ........................... 600/595 |
| 6,409,687 B1 * | 6/2002 | Foxlin ........................... 600/595 |
| 6,513,381 B2 * | 2/2003 | Fyfe et al. ....................... 73/510 |

(Continued)

FOREIGN PATENT DOCUMENTS

| EP | 1 970 671 A1 | 9/2008 |
| JP | 2003169702 | 6/2003 |

OTHER PUBLICATIONS

A. Jimenez, et al., "A comparison of pedestrian dead-reckoning algorithms using a low-cost MEMS IMU", WISP 2009, IEEE International Symposium on Intelligent Signal Processing, Aug. 26-28, 2009.*

(Continued)

*Primary Examiner* — John Breene
*Assistant Examiner* — Ruihua Zhang
(74) *Attorney, Agent, or Firm* — Blue Filament Law PLLC; Avery N. Goldstein

(57) ABSTRACT

A subject location tracking process is provided that includes the attachment of a system to a subject where the system includes a radiofrequency sensor integration module, an inertial tracking module, and a microprocessor. Radiofrequency signals are communicated from the radiofrequency sensor integration module to a remote radiofrequency transceiver beacon. A measured range is determined between the radiofrequency sensory integration module and the beacon. An error value E is then computed between the measured range and a predicted range. The predicted range is computed from the inertial tracking module alone based on positional data as to location and orientation of the system. The location data of the subject is determined with a microprocessor and displayed at the location. The present invention operates to provide a high degree of accuracy as to the position of a subject in spite of intermediate obstructions and without reliance on global position satellite systems, fixed reference signals, or line of sight.

15 Claims, 16 Drawing Sheets

(56) References Cited

U.S. PATENT DOCUMENTS

| | | | |
|---|---|---|---|
| 6,922,632 B2 * | 7/2005 | Foxlin | 701/517 |
| 7,395,181 B2 * | 7/2008 | Foxlin | 702/155 |
| 7,725,253 B2 * | 5/2010 | Foxlin | 701/519 |
| 2003/0045816 A1 * | 3/2003 | Foxlin | 600/595 |
| 2004/0073360 A1 | 4/2004 | Foxlin | |

OTHER PUBLICATIONS

Quentin Ladetto, On foot navigation: continuous step calibration using both complementary recursive prediction and adaptive Kalman filtering; Geodetic Laboratory, Institute of Geomatics, Swiss Federal Institute of Technology, Lausanne.

Lauro Ojeda, et al. "Personal Dead-reckoning System for GPS-denied Environments" IEEE International Workshop on Safety, Security and Rescue Robotics (SSRR2007), Rome, Italy, Sep. 27-29, 2007.

Lauro Ojeda, et al., "Non-GPS Navigation with the Personal Dead-Reckoning System"; SPIE Defense and Security Conference, Unmanned Systems Technology IX, Orlando, Florida, Apr. 9-13, 2007.

G. Retscher, "An Intelligent Multi-sensor System for Pedestrian Navigation"; Journal of Global Positioning Systems (2006); vol. 5, No. 1-2:110-118.

Nikolas Trawny, et al. "Indirect Kalman Filter for 3D Attitude Estimation"; Technical Report, No. 2005-002, Rev. 51, Mar. 2005.

* cited by examiner

INTERTIAL TRACKING SYSTEM WITH PROVISION FOR POSITION CORRECTION

CROSS-REFERENCE TO RELATED APPLICATION

This application claims priority of U.S. Provisional Patent Application Ser. No. 61/306,132 filed Feb. 19, 2010, which is incorporated herein by reference.

FIELD OF THE INVENTION

The present invention relates generally to a system and process of determining the location of a person and, particularly, to a system and process of determining the location of person in a contained environment in which global position satellite or line of sight navigational beacons are inoperative.

BACKGROUND OF THE INVENTION

Miners, firefighters, and soldiers often operate in contained environments under danger of injury. The ability to locate an injured individual in a contained environment with accuracy speeds rescue efforts and therefore survival rates. Unfortunately, contained environments associated with mines, buildings, and remote battlefields render absolute position techniques such as global positioning satellite (GPS) based systems and triangulation methods ineffective due to signal interference caused by surrounding structures.

This problem, commonly referred to as pedestrian dead-reckoning (PDR), has been investigated and attempts to provide a working solution have involved various types of sensors such as acceleration sensors (based on acceleration) and gyroscopic sensors (based on rotational velocity), magnetic sensors (based on gyroscope heading), pressure sensors (based on altitude), ultrasonic sensors (based on distance), and cameras (based on stereo vision). Both acceleration sensors and gyroscopic sensors are subject to noise and bias. In general, there are three sources of error in measurements [10]: noise because of sensory electronics, bias of the sensor, and unknown scaling factor and offset of the sensor. Other sensor types also have distance limitations or are prone to distortions associated with a containing environment or clock timing limitations. Efforts to account for these errors have met with limited success and as a result a satisfactory subject tracking system within confined environments has not been developed.

The sensor in PDR systems is routinely placed on the foot of a user. The foot is usually the part of the body with the highest motion amplitude, and placing the sensor on the foot is considered to provide the highest signal-to-noise ratio of the sensor outputs. The foot also has the beneficial attribute of acting as a pivot point during walking motions and goes through a stationary period during the cyclic act of stepping. Thus, the sensor output is zero during the stationary period and allowing for zero-velocity updates, which can be used to correct estimation errors. Head-mounted and waist-mounted sensors have also been considered [2,5,12,13]. Ojeda et al. [17] have shown that the front of the sole is the part of the shoe that remains stationary for the longest period of time and is therefore the most suitable sensor position for zero velocity error corrections.

Noise is caused by the electronics that are needed for reading the correct sensor output. This noise is often characterized as zero-mean white Gaussian noise and often expressed in signal/$\sqrt{Hz}$. The bias of the sensors can be split up in two parts. The first one is the turn-on bias which is different every time the device is powered on. The other is the in-run bias, which varies with motion. Both of these biases are dependent on temperature. This makes a total bias of:

$$b_{total} = b_{turn-on} + b_{in-run}$$

The scaling factor and the offset are modeled as intrinsic sensor properties which do not change because of external factors, but are different for every sensor.

There are generally two categories of PDR systems described in literature. The first is based on step-counting and combines sensor signal-features like frequency, variance and mean value to estimate the stride. The second category (classical pedestrian navigation) is based on double integration of the acceleration signals to determine position.

The general layout of the most basic classical pedestrian navigation system is shown in prior art FIG. 1. The main sensors in such a system are accelerometers and angular rate sensors (gyroscopes). The 3D accelerometer provides the system with the magnitude of movements.

Because the accelerometer moves with the body, it is rotated with respect to the world frame. This makes it necessary to measure this rotation. This is done using the gyroscopes which measure the angular rate. Because of the fact that rotation operations in 3D are not commutative, the rotation cannot be found by integrating every angular rate component independently. Several methods exist to describe rotations.

A major problem in classical navigation is caused by low-frequency errors in the accelerometer and gyroscope signals because of bias and noise. As both the gyroscope and accelerometer signals are integrated, bias in the sensors will cause increasing errors in attitude and velocity, which will propagate into the position estimates. These errors have been dealt with through a zero-velocity update (often abbreviated as ZUPT or ZVU). Zero-velocity updates incorporate the estimation of bias and velocity errors when the sensors are stationary for a certain period of time. As the motions found during human movements are rather complex, implementations of the zero-velocity update assume that periods of zero acceleration are also periods of zero velocity (this is not true for motions in general). This assumption makes it possible to detect these periods by checking if the magnitudes of the acceleration and the angular rates are under a certain threshold [11]. Measurements done using zero-velocity updates are generally noisy as the foot is never completely still and the user position accuracy is limited. A common way to estimate sensor bias is using a complementary Kalman filter [3,5,7,11,12,14]. This filter is optimal for Gaussian measurement noise and Gaussian system noise, which is applicable in such measurements. However, because the measurements require non-linear transformations (rotation) to fit the state variables, the extended Kalman filter is mainly used.

The second method of stride estimation is using a regression model on several signal features. This method does not rely on the double integration of the acceleration and suffers less from bias errors. Instead, step frequency and acceleration signal properties like variance, mean and amplitude are used for error estimation. These parameters are in general determined from the acceleration magnitude instead of the individual acceleration signals. This is done to remove the influence of gravity due to a change in orientation:

$$|a| = \sqrt{a_x^2 + a_y^2 + a_z^2} - g, \text{ where } g \text{ is the gravity}$$

The parameters are combined in a regression model, which matches these partly independent parameters to an estimate for the travelled distance. The used regression models are often linear [10,13,14] but experiments with function approximators (neural networks) have proven to be successful [2,15]. Because the same parameters can be found for numerous motions (forward walk, backward walk, walk on the spot), this method of pedestrian dead-reckoning is very motion dependant. In most of these models, a forward walk on flat ground is assumed with a natural pattern. Because first responders generally make all kinds of movements, this would require an accurate motion classification.

The primary form of motion classification used in most of the literature [3,13,14] is step detection. To detect steps, features of the sensor information need to be found that uniquely define a step and this has proven difficult.

Particle filtering is an approximation of Bayesian estimation, using an approximation of the probability density functions by a discrete distribution of weighted particles that is also used for error estimation. The strength of particle filters in pedestrian dead-reckoning is that it can cope with non-linear probability functions and can therefore cope with certain rules about which particles are possible solutions and which particles are not. This technique has been used by Widyawan et al. [1] and Woodman et al. [6] to develop an indoor positioning system, complemented by a building plan.

In spite of these efforts and ever-increasing complexity of signal processing there exists a need for a system and a process for reliably locating a person in a contained environment even when the person goes through times of kneeling, climbing, and other activities that have proven difficult to model and therefore distort the calculated position of the user. There also exists a need for a subject tracking system that provides positioning between a subject and a transceiver without reliance on external GPS interaction or clock synchronization therebetween that have confounded prior art distance separation tracking processes.

SUMMARY OF THE INVENTION

A subject location tracking process is provided that includes the attachment of a system to a subject where the system includes a radiofrequency sensor integration module, an inertial tracking module, and a microprocessor. Radiofrequency signals are communicated from the radiofrequency sensor integration module to a remote radiofrequency transceiver beacon. A measured range is determined between the radiofrequency sensory integration module and the beacon. An error value E is then computed between the measured range and a predicted range. The predicted range is computed from the inertial tracking module alone based on positional data as to location and orientation of the system. The location data of the subject is determined with a microprocessor and displayed at the location. The present invention operates to provide a high degree of accuracy as to the position of a subject in spite of intermediate obstructions and without reliance on global position satellite systems, fixed reference signals, or line of sight.

BRIEF DESCRIPTION OF THE DRAWINGS

Numerous aspects of the present invention are better understood with reference to the following drawings that constitute part of the specification. Components depicted in these drawings are not necessarily to scale and instead are provided to emphasize operational principles of the present invention. Throughout these drawings, like reference numerals designate corresponding elements throughout the various figure views.

DETAILED DESCRIPTION OF THE PREFERRED EMBODIMENTS

The present invention has utility as a process and system for determining the position, synonymously referred to herein as location, of a subject with a high degree of accuracy in spite of intermediate obstructions and without reliance on GPS, fixed reference signals, or line of sight. Through resort to a coupled radio frequency (RF) sensor and at least one inertial sensor, the error estimation problems that have plagued the prior art have largely been overcome to provide accurate subject position to within 5 meters and even less than 1 meter. The inventive process uses RF range measurements to known reference locations to track the absolute motion of a subject in combination with the relative motion information from at least one inertial sensor to filter and correct the individual range measurements to known reference locations before the range information is used to estimate the position. This gives an inventive system and process the ability to correct for position error that increases over time in conventional inertial sensor PDRs without resort to external correction inputs. By also using the inertial measurements of relative position to correct the RF absolute measurements, a robust position detection system and process are provided that are not subject to clock timing or external correction inputs. The actual range measurements are optionally filtered and corrected prior to calculation of a position. Optionally, the actual range measurements are weighted, and a weighting function is included in the position estimation. It is appreciated that with an array generating several possible position solutions is readily subjected to optimization routines and a best position calculated based on various combinations of range measurements, and these possible positions are weighted based on the inertial sensor information. It is also appreciated that an inventive system can be integrated with a conventional GPS based communication and radio tracking systems such as the Rifleman and JTRS-SFF radios currently in use.

Inertial tracking sensors operative herein include a gyroscope and accelerometers.

A subject according to the present invention includes a human, a mobile robot, an unmanned aerial vehicle, and an animal such as a dog, horse, cat, monkey, dolphin, cow, mouse, rat, bird, or insect.

Figure 22:
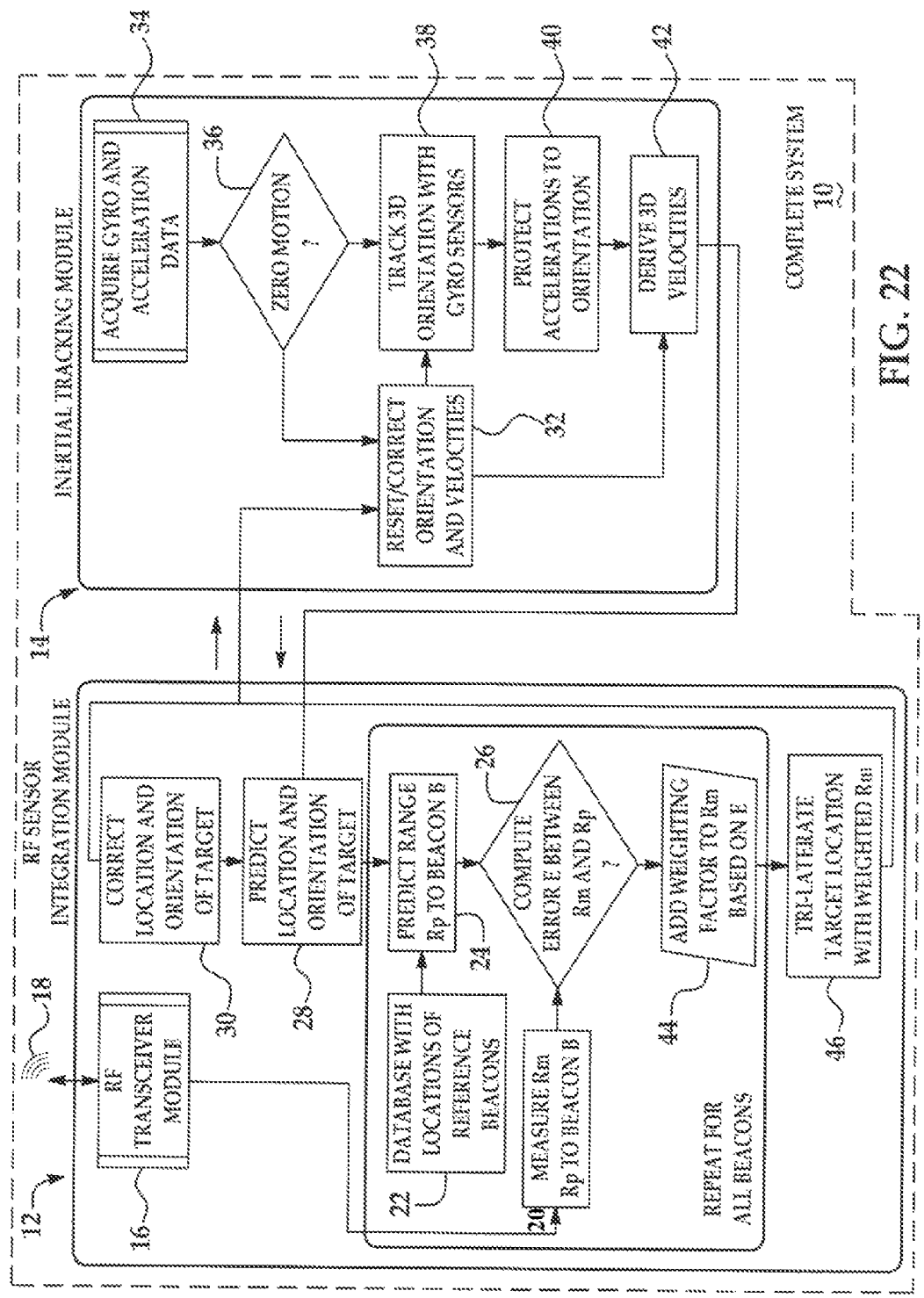
FIG. 22 is a schematic flowchart of the interaction between a radiofrequency sensory integration module and an inertial tracking module according to the present invention.

A schematic flowchart of an inventive process is shown generally at 10 in FIG. 22 showing the interaction of RF sensory integration module 12 and an inertial tracking module 14. The present invention in coupling the modules 12 and 14 allows for correction of errors that compromised the value of conventional position measurement systems associated with either type of module operating without interaction.

The RF sensory integration module 12 includes a RF transceiver module 16 for communicating radiofrequency signals with a remote RF transceiver beacon by way of an antenna 18. The transceiver module 16 has software to measure range, Rm to an exemplary RF Beacon B at step 20. A database of known positions for Beacon B and other beacons 22 is provided to estimate a predicted range from Beacon B Rp at step 24. An error value E between Rm and Rp is computed at step 26. An input to estimate a predicted range from Beacon B Rp at step 24 is the prediction of location and orientation of the subject target at step 28. The prediction of step 28 includes as inputs the corrected location and orientation of the subject target at step 30 and the positional data as to location and orientation of the subject target output from the inertial tracking module 14. The corrected location and orientation of the subject target at step 30 is also communicated to the inertial tracking module 14 to aid in resetting or correcting the orientation or velocity values at step 32 as generated by the inertial module sensors. Absent this input of RF generated data, the inertial tracking module 14 is otherwise conventional in acquiring inertial data at step 34 and based on the quality of the data acquired at step 34 the decision is made whether to zero the motion of the sensor(s) at a step 36 to a physical event such as a step fall. 3D orientation is tracked at step 38 and used to project acceleration scalar values onto orientation vectors at step 40 which in turn provide 3D velocity values at step 42. These velocity values are preferably the inputs into prediction of location and orientation of the subject target at step 28 from the inertial tracking module 14; however, it is appreciated that sensor data in any stage of computation between steps 34-40 is used as inputs for prediction of location and orientation of the subject target at step 28 with straightforward computational modifications.

Preferably, a weighing factor is added to Rm based on the error E at step 44 prior to trilaterating the location of the subject target at step 46. It is appreciated that in situations where less refined location information is required that a weighing factor need not be used. It is also appreciated that in addition to trilaterating a subject location, other conventional convergence calculations are readily performed such as a triangulation and random walk location optimization. While at least one beacon is present to provide communication with the RF transceiver module 16, preferably at least two such beacons are present and in communication with the module 16 on different channels.

Alternatively, independent locations and orientations may be determined by the inertial tracking module 14 and RF sensory module 12 using inertial and range measurements, respectively. The error in position or orientation may then be used to update parameters or biases within either module such that the positions and orientations converge.

The inventive system includes sensors and a software component that is implemented on a sufficiently powerful microprocessor to process data being generated in tandem by at least one RF module 16 and at least one inertial sensor to form a mutually corrective system. This procedure requires access to individual range information and the capability of each RF node in the network to acquire range information to each other node in the network. The procedure is graphically depicted in 9A. This diagram also illustrates the processing of range information into location determination.

RF transceiver modules 16 are known to the art and illustratively include those detailed in US 20090138151; US 20080234930; US 20080103696; and those detailed U.S. Provisional Application Ser. No. 61/289,691. Preferably, the RF sensor is in communication with an RF transceiver having the attributes of isolation between input and output channels with interaction via a hardwired loop.

The inertial tracking module 14 preferably includes a gyroscope such as a 3D electronic gyroscope, 2D gyroscope with tilt compensation, 1D gyroscope, or a combination thereof. The gyroscope provides for initial orientation and for external orientation reference input. It is appreciated that the type of gyroscope is dependent on the application and on the mounting properties of the module onto the target. For instance, a 1D gyroscope is adequate for robots operating on relatively flat surface. For a personnel tracking solution, where no a priori mounting location is determined, a full 3D gyroscope or 2D gyroscope with tilt compensation is preferred. The gyroscope provides absolute reference information to the Kalman filter for global orientation. A Kalman filter process operative in the present invention to manipulate inertial track module sensor data into velocities is provided in FIG. 9B.

The inertial tracking information is used by the Kalman filter in conjunction with the internal motion dynamics model to predict the position, orientation and velocity of the subject. The RF range/position information and the heading information from the gyroscope is used to correct for the prediction since it bears the absolute reference to known locations and direction.

Figure 5:
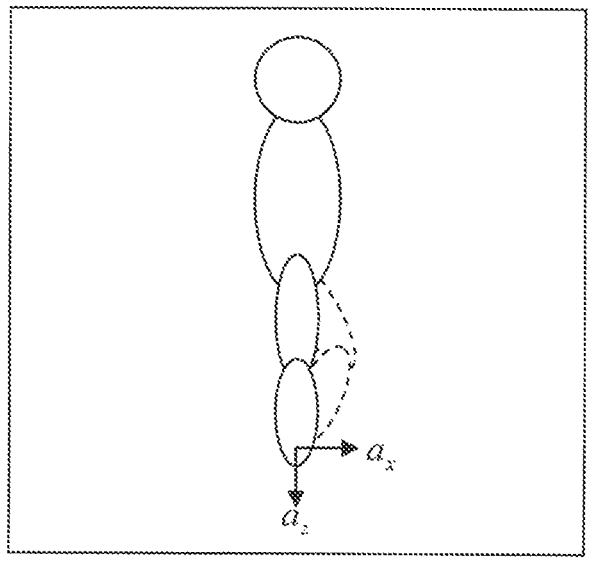
FIG. 5 is a schematic of a sensor configuration on a human body.

In FIG. 5, a block diagram of the initial signal processing for a 2D ankle mounted sensor (FIG. 6) is shown as would be performed by module 14. It is appreciated that the sensor is amenable to mounting on a foot, waist, torso, or head of an animate subject and any portion on an inanimate subject that is coupled to a periodic movement during translation. In the embodiment depicted in FIG. 5, the sensors are a 2D accelerometer and a single axis gyroscope. This arrangement models the pedestrian navigation problem as a 2D problem by approximating the leg movement as being a motion that is constrained to the x,z-plane, hence it neglects sideward motion of the leg.

The signals coming from the sensors are first stored in a signal memory, while features of the signals are identified that can be used for step detection. The step detector determines the beginning and end of a step. This information is then used to retrieve the acceleration and gyro signals during the step from the signal memory for further processing.

The first processing that is done is estimation of the orientation of the sensors with respect to the world frame. This orientation estimation is done, based on the assumption that the velocity at the beginning of the step and the end of the step is equal to zero. The calculated orientations are used to transform the acceleration signals from body-frame to world frame and doubly integrated to update the position.

Figure 6:
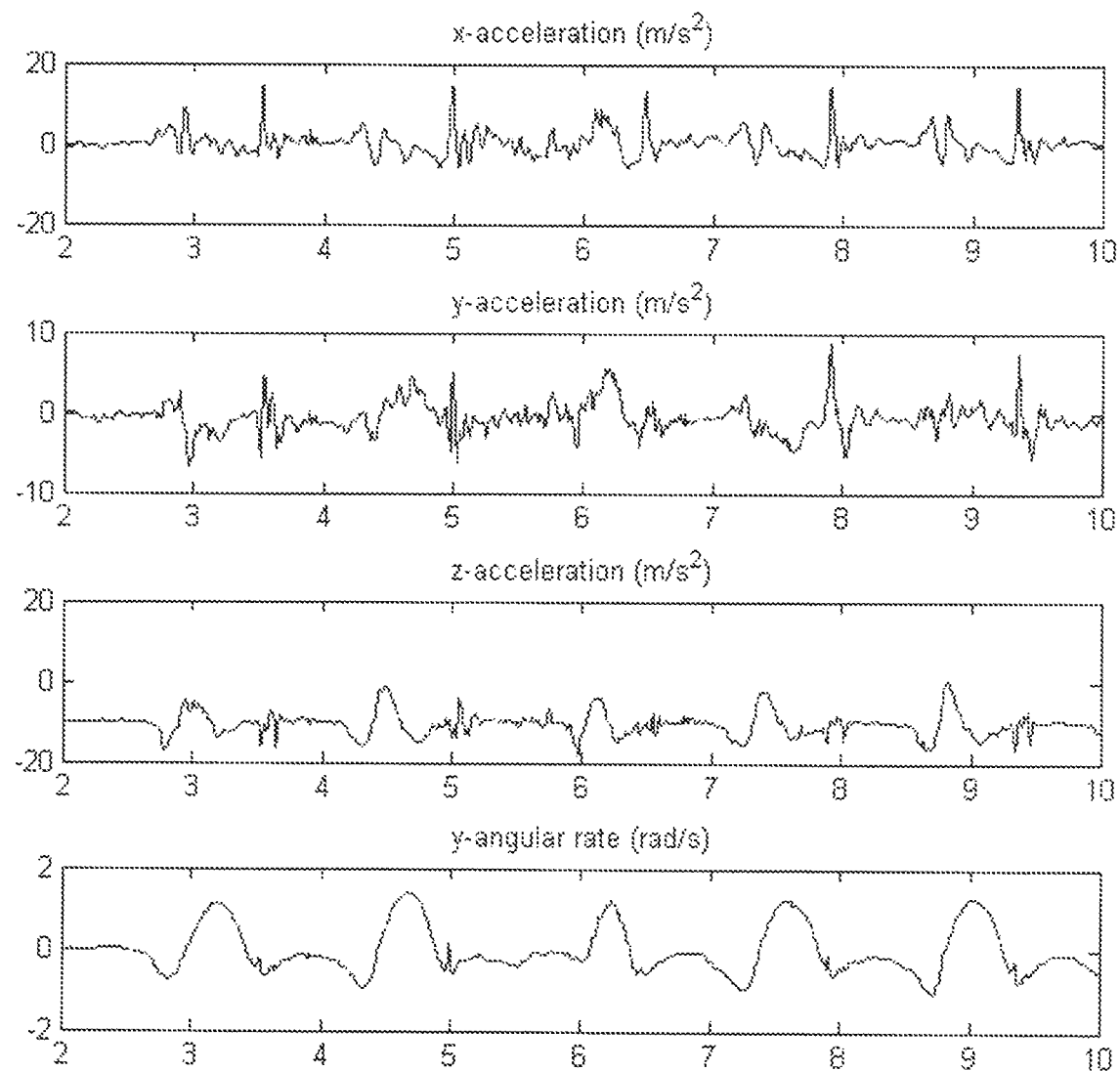
FIG. 6 are graphs of parameters associated with walking.

In FIG. 6, a preliminary measurement of a walking person is shown. The regular walking motion is clearly visible. Several features can directly be identified from these measurements: clear shape of the angular velocity signal (extrema and timing) and high frequency disturbance when foot is put down on the ground in acceleration signals.

Figure 7:
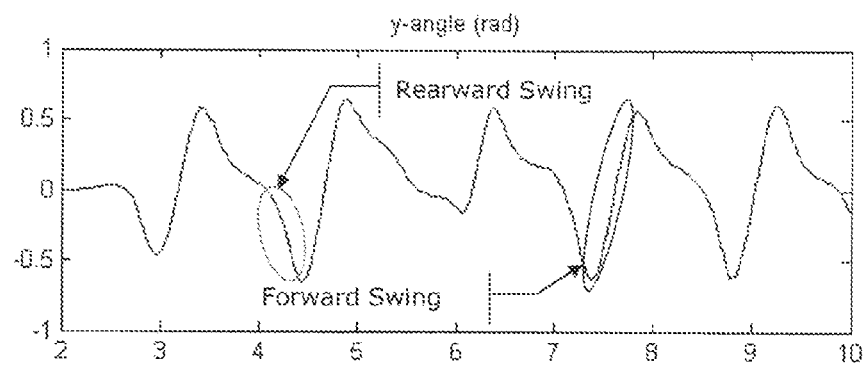
FIG. 7 is a graph of integrated angular rate signal operative in the present invention.

The acceleration signals are subject to gravity and a direct integration to position would therefore result in large errors. The angular rate, however, is not subject to gravity and can therefore easily be integrated to a position. This results in a signal as shown in FIG. 7.

Again, the regular pattern is clearly visible. A quick and long rise is observed when the leg is swung forward. The preparation for this swing is also noticeable by the quick descent with increasing backward angular velocity when the foot is lifted off the ground. These are important properties of the signal that are indicators for a walking motion. It has to be noted, however, that this is a measurement of a regular motion and not of individual steps.

The signal coming from the gyroscopic sensor is simple and clear. It is therefore a good candidate for feature extraction. By integrating the angular velocity signal, the angle of the lower leg with respect to the ground is acquired, with an unknown offset. Discrete integration is done by summation of the sampled angular velocity over time. The signal is bound to have bias that will introduce an error proportional to the time. This bias needs to be removed. A quick non-linear filter to reduce bias effects is a multiplication of the integrated quantity value with a number <1 at each time step.

It results in the following recursive integration equation:

$$\alpha(n+1) = [\alpha(n) \cdot k] + \frac{v(n+1)}{F_s},$$

where $\alpha$ is the angle, k is the attenuation factor and v is the angular velocity signal.

This type of bias filtering will also remove the offset caused by the arbitrary start time of integration. As opposed to a regular LPF, it has the advantage that it introduces no delay, is very easy to implement and suitable for the task of step counting. The factor k has been set to 0.99 with a sampling frequency of 200 Hz.

After the acquisition of the integrated angular rate, the features of the signal have to be extracted. Because the extreme values are important features in identifying the angular position signal, a detector is developed to identify them. As the signal will be subject to irregularities, a simple zero-crossing detector for the angular rate signal will not suffice and a more advanced detector needs to be developed. A desirable detector ideally is able to detect position of the extreme values, able to quantify the magnitude of the extreme values, and is robust to highly local extreme values due to noise.

A simple way of detecting extreme values is to keep record of the minimum value and the maximum during a certain window in time. If one sample remains to be the maximum or the minimum during this period, it can be marked as an extreme value.

Figure 8:
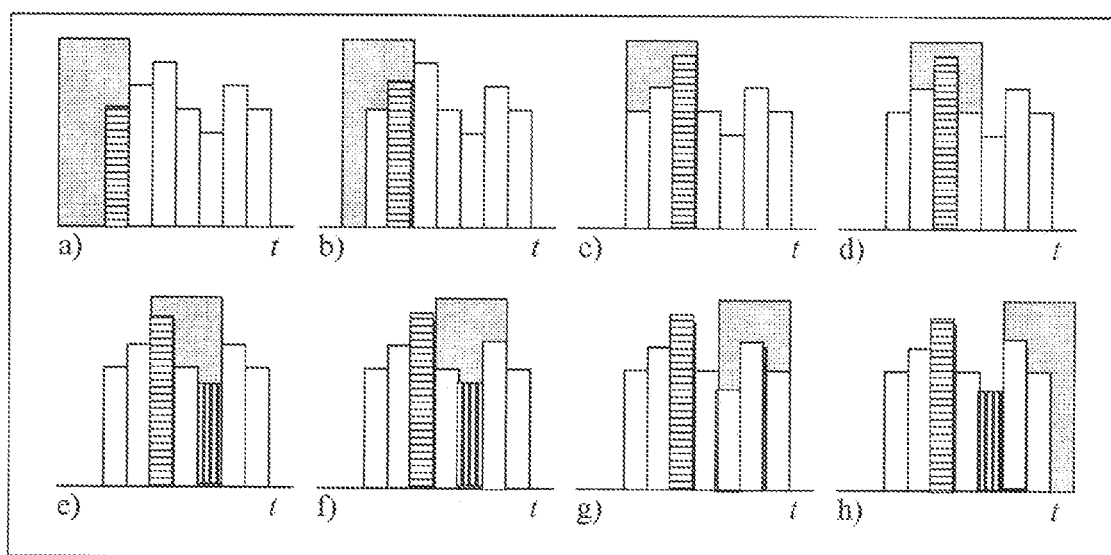
FIG. 8 is a schematic for finding extrema according to the present invention.

A graphical representation of this method is shown in FIG. 8 for a window of three samples. The window (grey) moves to the right in each figure, which represents passing of time. In sub-figures a, b and c a new maximum (horizontal hash) is found each sample time. During sub-figures d and e, the maximum remains the same and is finally marked as a definite maximum. The same procedure holds for the minimum (vertical hash) in sub-figures e, f and g, Finally, sub-figure h shows the recognized extrema.

Figure 10:
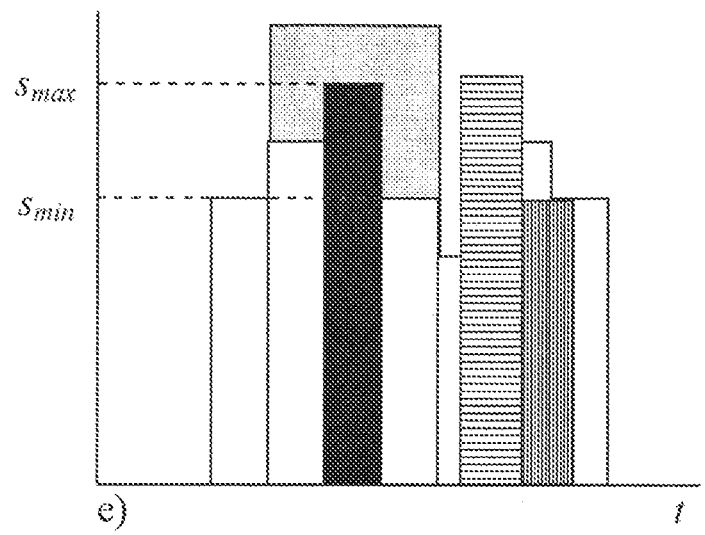
FIG. 10 is a graph depicting maximal magnitude estimation.

This takes care of localization of the extreme values. The next step is determining the magnitude of the extreme values. Before the magnitude can be attributed to the maximum, a sensible magnitude measure needs to be defined. A useful magnitude measure would represent the size of the extreme value with respect to its surroundings. Such a measure would for instance be the difference between the maximum value and the minimum of the boundary values inside the window. By calculating the distance between minimum and maximum in the window, such a measure is defined. This is shown graphically in FIG. 10.

Figure 11:
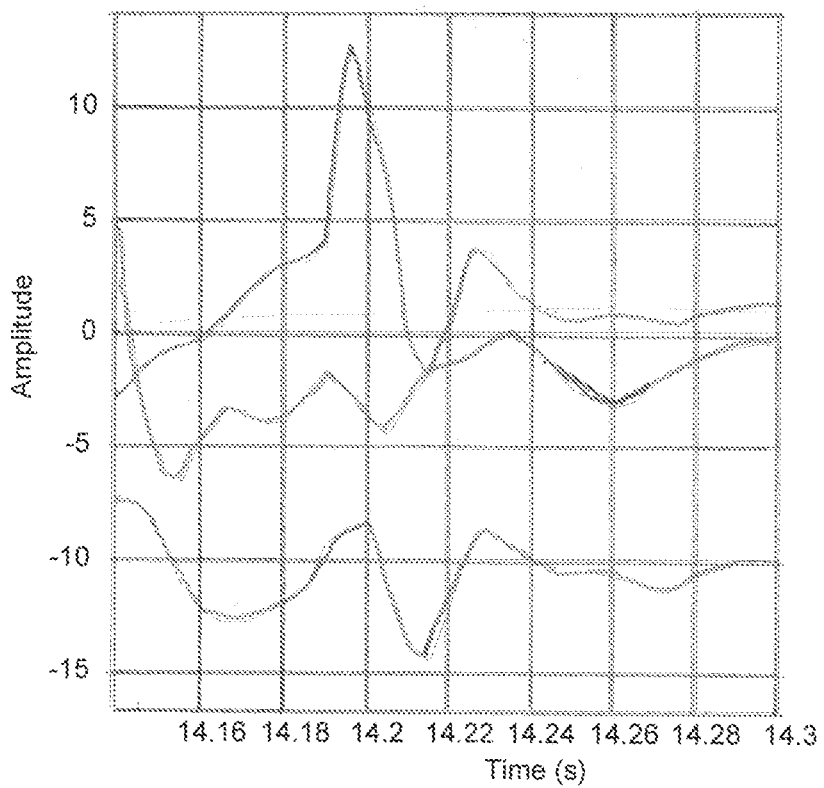
FIG. 11 is a graph depicting the acceleration signals during foot impact.

The high frequency disturbance that is found in the acceleration signals when the foot hits the ground can be used for step identification. To filter the high frequency, its frequency is first determined. In FIG. 11, the acceleration signals are shown during an impact.

The frequency of the disturbance is about 30 Hz, which is much higher than the other frequencies during motion. The acceleration signal is therefore processed by a high pass filter to distinguish the disturbance from the rest of the signal. It is empirically determined that a $4^{th}$ order Butterworth filter tuned at 25 Hz is sufficient to give a reliable filtering of the low-frequency motion, while preserving the high frequency disturbance.

Figure 12:
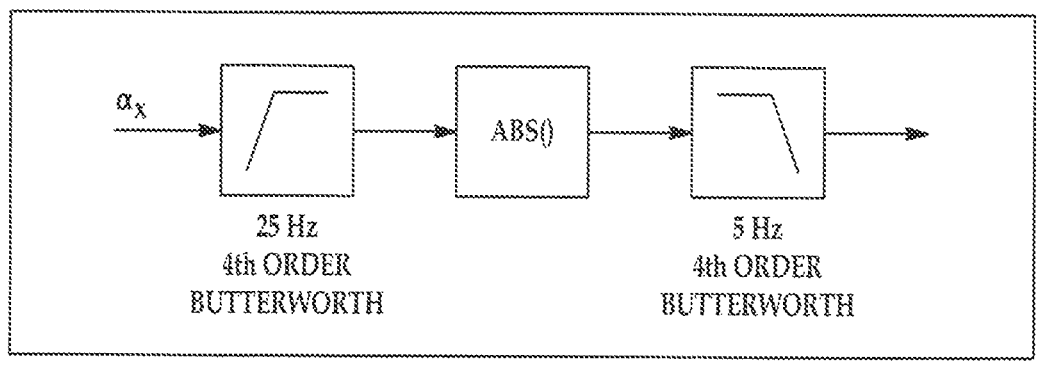
FIG. 12 is a block diagram depicting filtering the absolute value of the high-frequency signal using a $4^{th}$ order Butterworth low-pass filter to yield a spike with a clear maximum at time of impact.

To be able to quantify the high-frequency disturbance, a simple envelope detection is applied, by filtering the absolute value of the high-frequency signal using a $4^{th}$ order Butterworth low-pass filter tuned to 5 Hz. This results in a sufficient attenuation of the high-frequency components and results in a spike with a clear maximum at time of impact. A block diagram of this procedure is shown in FIG. 12.

Figure 13:
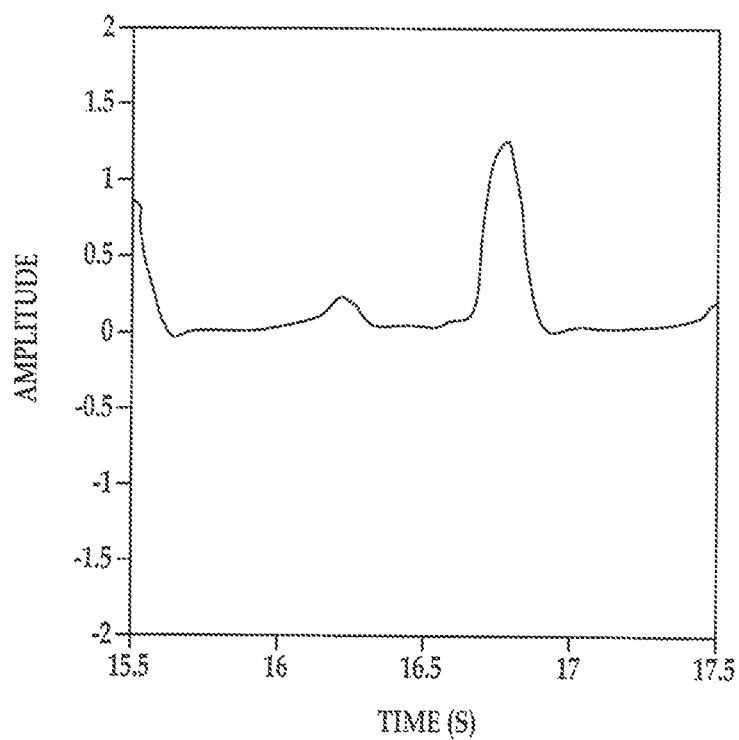
FIG. 13 is a graph of amplitude as a function of time for a step showing a large response on impact with a smaller prior peak corresponding to lifting the foot of the ground.

As can be seen in FIG. 13, a large response is observed on impact. A smaller peak is observed before the large one, which corresponds to lifting the foot of the ground. To determine the impact, an extrema detector discussed is used together with an empirically determined threshold.

Figure 14A:
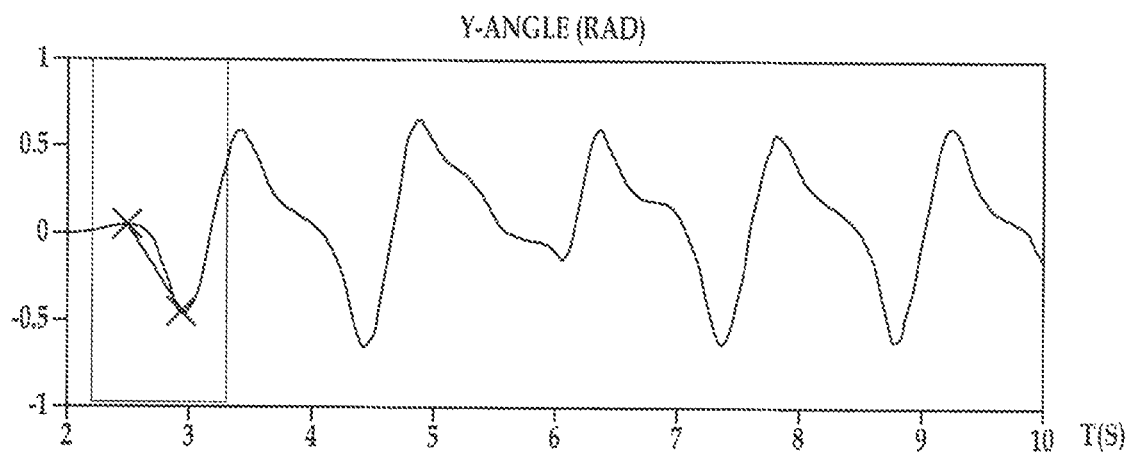
FIG. 14 is graphs of angle as a function of frequency periods for step counting.
Figure 14B:
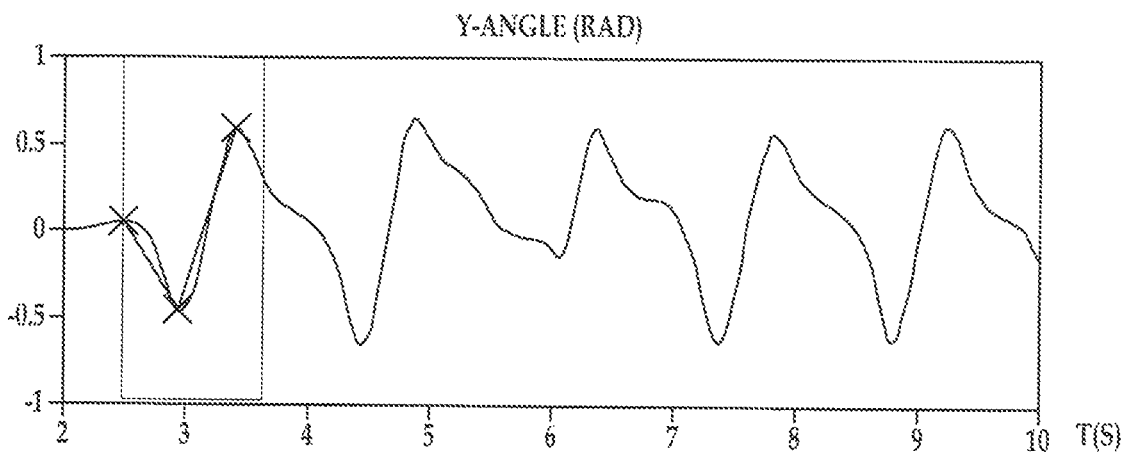
Figure 14C:
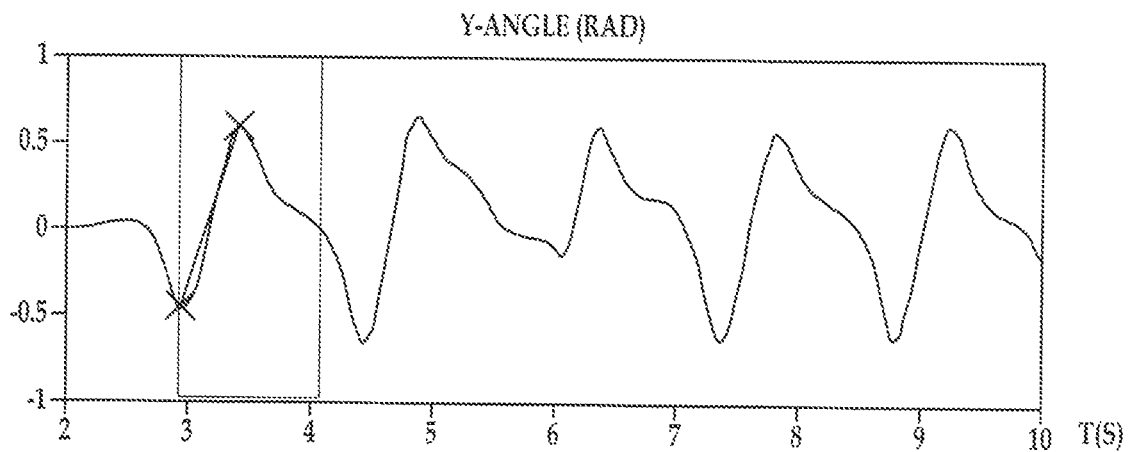

Step counting begins with detecting all the extrema of the integrated angular rate signal (angle) within a certain step detection window, as shown in FIG. 14. It looks for the high transition from low to high (forward step) and from high to low (backward step), If two or more extrema are found, it compares all neighboring extrema and looks for the best match (b). When this best match is found and remains the best match until the corresponding extrema reach the beginning of the window, the pair of extrema is marked as a possible step (c).

Next, a threshold is applied to the angle difference between the extrema and also to the difference quotient. Steps under the threshold are rejected as being noise. The final step consists of detecting the heel impact associated with the swing. If the heel impact is found right after the swing, the step is marked as valid and sent to the rest of the system for further processing.

Stride estimation is a crucial part in determining the traveled distance. As the stride is integrated into a position, any errors in the estimated distance will accumulate over time. Significant sources of error are gravity and bias in the acceleration and angular velocity signals.

Figure 15:
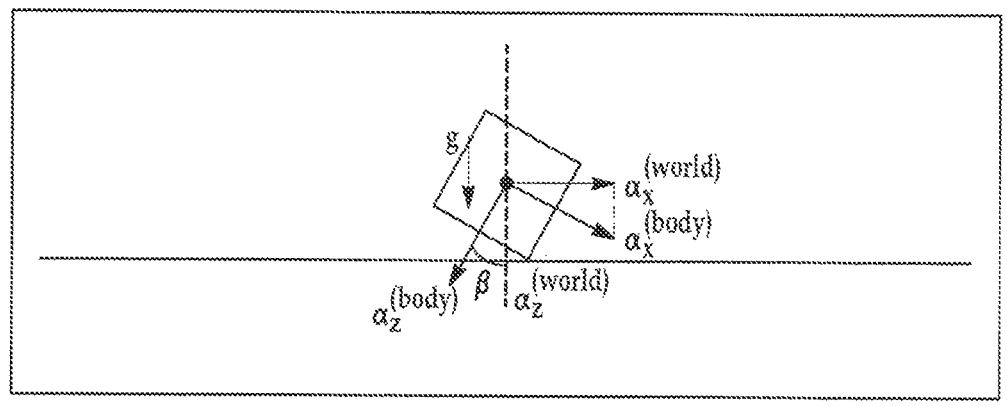
FIG. 15 is a schematic of situation overview of the angular relation between body-fixed and world frame.

Gravity tends to be one of the largest sources of error in the acceleration signals. As the angular rate in y-direction is part of the measurements, it is possible to estimate the direction of the gravity vector. In FIG. 15, a situation overview is shown of the angular relation between body-fixed and world frame. The following equations hold for this particular setup:

$$a_x^{(world)} = a_x^{(body)}\cos(\beta) - a_z^{(body)}\sin(\beta)$$

$$a_z^{(world)} = a_z^{(body)}\cos(\beta) + a_x^{(body)}\sin(\beta)$$

Assuming that there is no movement in y-direction and no noise, the following equation holds for the acceleration in the world frame:

$$a_x^{(body)} = \tilde{a}_x^{(body)} + a_{gravity}\sin(\beta)$$

$$a_x^{(body)} = \tilde{a}_x^{(body)} + a_{gravity}\sin(\beta)$$

where a and ã represent real and measured acceleration.

The present invention is further detailed with respect to the following nonlimiting example.

Example 1

Gravity Compensation of Gyroscopic Sensor Output

Figure 16:
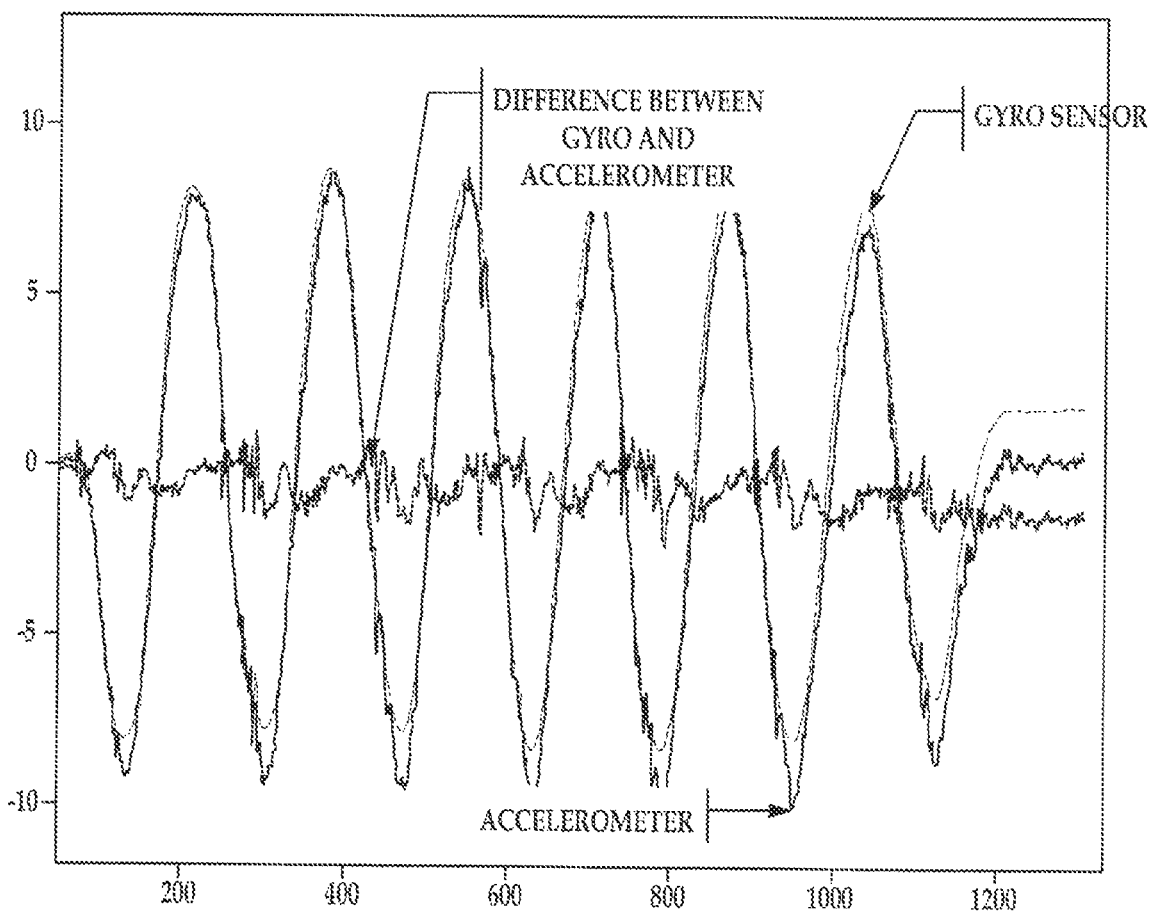
FIG. 16 is plot of acceleration as a function of time for gravity compensation on rotating sensor motion.

As an initial test, the sensor is rotated clockwise and counterclockwise several times. Using the algorithm described above, gravity compensation is done in the x-direction and the signal is converted to the world frame coordinate system. The result of this measurement is shown in FIG. 16.

It can be observed that the gravity compensation is able to greatly reduce the error on the acceleration signal. However, it comes at the expense of an introduced error that increases with time, caused by bias and errors in the angular rate measurements.

Applying this algorithm to measurements of a forward walk, gyroscope drift of the angle causes large errors. Furthermore, the initial angle corresponding to the upright position is not known. An algorithm that deals with these issues will now be developed.

Example 2

Determining Upright Position and Velocity

In most of the available literature, determining the upright position is done during Zero Velocity Updates (ZUPTs) while the foot is flat on the ground. The angle that is acquired by integrating the gyroscope signal consists of the actual angle and an offset $b_\beta$:

$$\tilde{\beta} = \beta + b_\beta$$

Assuming that the velocity is zero while the foot is on the ground, the integral of the acceleration signal should then be zero in all directions. This provides the integration constant. The velocity in x-direction of the world frame can be written as (assuming that the bias of the gyro is constant during one step):

$$v_x^{(world)}(t_1) = \int_{t_0}^{t_1} a_x^{(world)}(t)dt$$

$$= \int_{t_0}^{t_1} a_x^{(body)}(t)\cos\beta(t)dt - \int_{t_0}^{t_1} a_z^{(body)}(t)\sin\beta(t)dt$$

By substituting the equations for calculating the actual acceleration from measurements, $$a_x^{(body)} = \tilde{a}_x^{(body)} + a_{gravity}\sin(\beta)$$

$$a_z^{(body)} = \tilde{a}_z^{(world)} + a_{gravity}\cos(\beta)$$

the following equation is found:

$$v_x^{(world)}(t_1) = \int_{t_0}^{t_1} (\tilde{a}_x^{(body)}(t) + a_{gravity}\sin\beta(t))\cos\beta(t)dt -$$

$$(\tilde{a}_z^{(body)}(t) + a_{gravity}\cos\beta(t))\sin\beta(t)dt =$$

$$= \int_{t_0}^{t_1} \tilde{a}_x^{(body)}(t)\cos\beta(t)dt + \int_{t_0}^{t_1} a_{gravity}\sin\beta(t)\cos\beta(t)dt -$$

$$\int_{t_0}^{t_1} \tilde{a}_z^{(body)}(t)\sin\beta(t)dt - \int_{t_0}^{t_1} a_{gravity}\cos\beta(t)\sin\beta(t)dt$$

$$= \int_{t_0}^{t_1} \tilde{a}_x^{(body)}(t)\cos\beta(t)dt - \int_{t_0}^{t_1} \tilde{a}_z^{(body)}(t)\sin\beta(t)dt$$

If the ideal angle is now substituted with the measured angle using $\tilde{\beta} = \beta + b_\beta$, this becomes:

$$v_x^{(world)}(t_1) = \int_{t_0}^{t_1} \tilde{a}_x^{(body)}(t)\cos\beta(t)dt - \int_{t_0}^{t_1} \tilde{a}_z^{(body)}(t)\sin\beta(t)dt =$$

$$= \int_{t_0}^{t_1} \tilde{a}_x^{(body)}(t)\cos(\beta(t) - b_\beta)dt -$$

$$\int_{t_0}^{t_1} \tilde{a}_z^{(body)}(t)\sin(\beta(t) - b_\beta)dt$$

This equation now describes the velocity at $t_1$, when the velocity at $t_0$ is zero. If we define $t_0$ as the beginning of a step (v≈0) and $t_1$ as the end of a step (v≈0), this equation should result in zero. By using hill climbing, a good approximation of $b_\alpha$ can be found.

Figure 17:
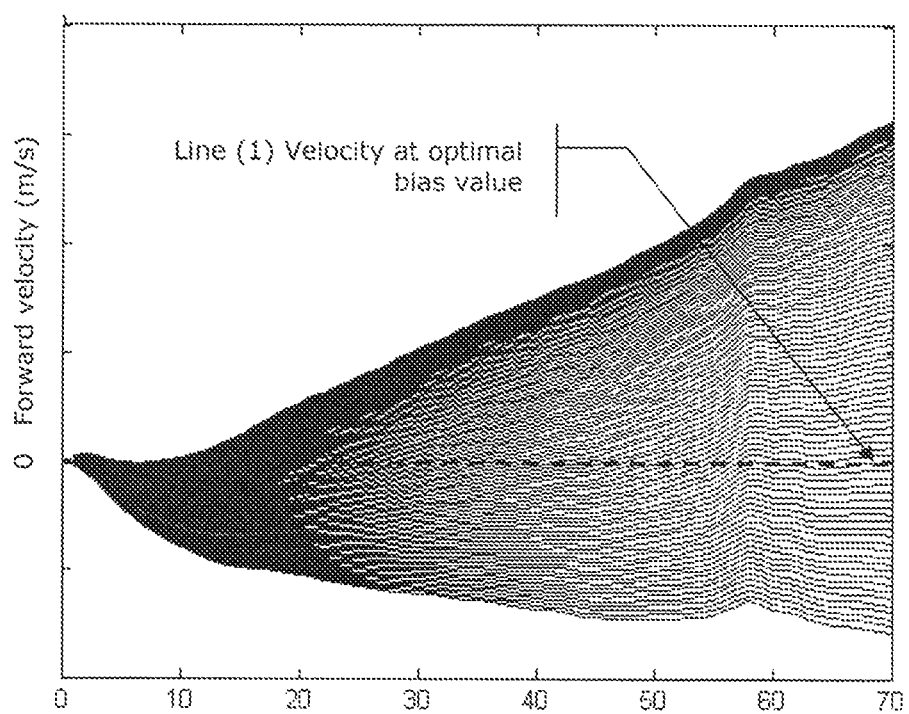
FIG. 17 is a plot of velocity for different gyroscopic bias during a backward step.

In FIG. 17, the velocity over time during a backward step is shown for different values of $b_\alpha$. It shows that for a particular bias, the velocity signal becomes near zero around sample 57 (when the foot is put down on the ground) and remains around zero. Because of the delay in the ground impact detection algorithm, the end of the step is not detected until sample 70.

Figure 18:
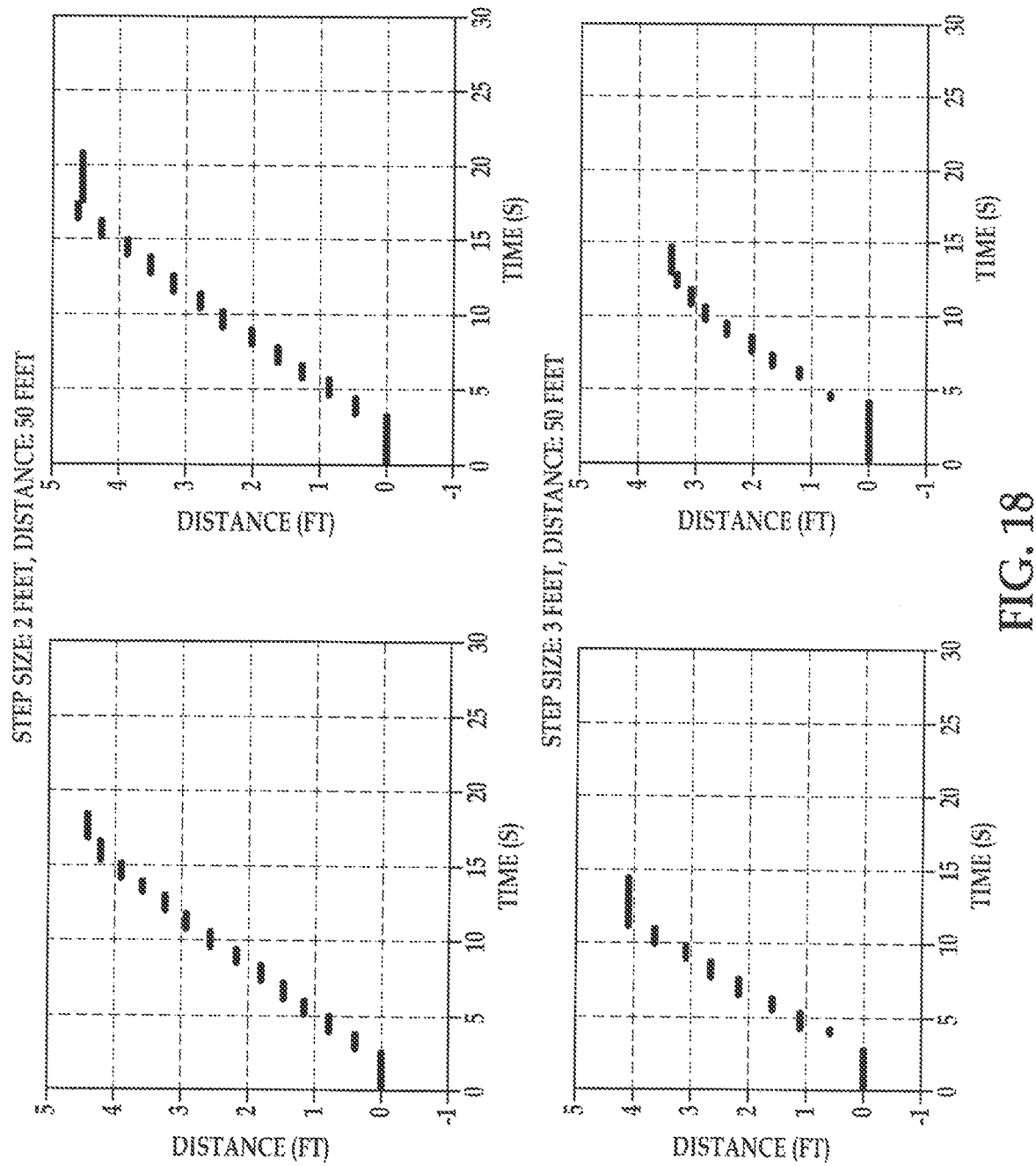
FIG. 18 is plots of tracking a person during a 50 feet straight line with constant step size.
Figure 19:
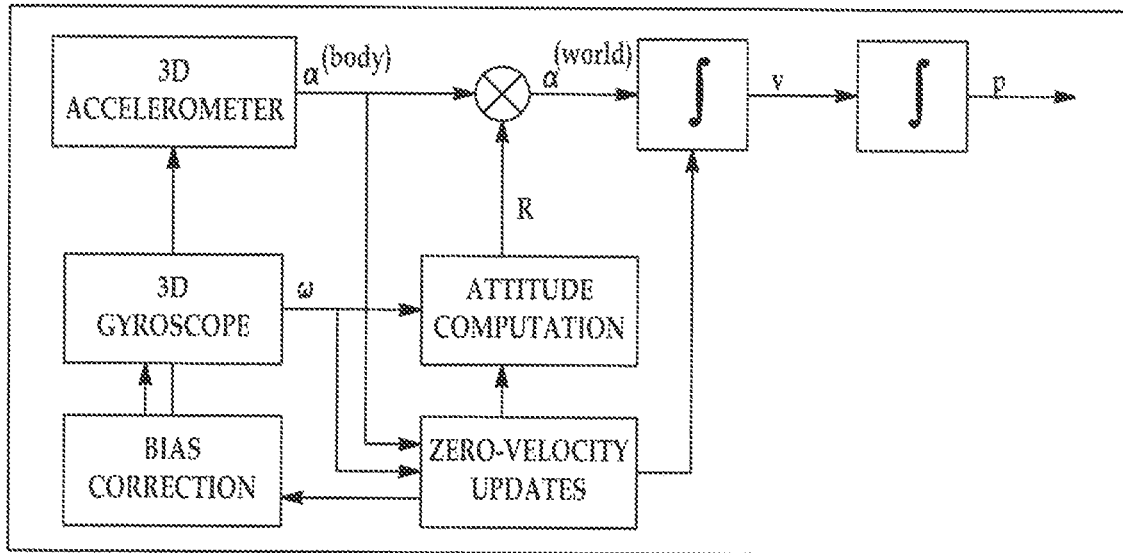
FIG. 19 is a schematic of a foot mounted inertial tracking module according to the present invention.

In FIG. 18, the results of tracking a person during a 50 feet straight line with constant step size is shown. It seems that the measured distance is only a small portion of the real distance. Because the system only integrates acceleration during swing, the assumption that almost all of the motion occurs during the swing may be incorrect. In rest (flat portions), the angle seems to drift only gradually. In motion, the angle drifts upward with a steady pace, as indicated by the trend line. Bias filtering for such a large drift causes the signal to be off by several degrees. The most likely cause for the effect is motions of the sensor that are not in the 2D x,z-plane. It seems that a 3D estimation is required for a correct integration of the angular rate signal. These problems with the algorithm give rise to develop a more accurate system with 3D orientation and a foot-mounted sensor. The accelerometers and gyroscopes measure angular rate and acceleration of three orthogonal axes. The angular rates are used to calculate the orientation (attitude computation). The result of this is used to transform the body-accelerations to accelerations in the world frame. These are then integrated twice into a position. When the foot is standing still on the ground, the errors in velocity and attitude can be corrected using so called zero-velocity updates. A schematic of an inertial tracking module used in subsequent examples is depicted in FIG. 19.

Example 3

Rotations

As rotations are non-linear operations, a linear integration of angular velocity is not applicable. There exist several methods for describing rotations including Euler angles and quaternions. Euler angles describe a rotation as three consecutive rotations about the principal axes of a frame. A common convention for Euler angles found in navigation systems is the yaw, pitch, roll. It describes a rotation as a combination of a yaw (rotation of a body around the vertical axis), a pitch (a rotation about the sideward axis), and a roll (rotation about the forward axis). Because in navigation these directions usually correspond to x, y and z, these angles are also called XYZ-angles.

Because these rotations are very intuitive and easy to understand, they are very commonly used. They have a few major drawbacks however when used to describe rotations by angular rates. Firstly, a transformation is required to transform the angular rate vector to a yaw, pitch and roll. Secondly, Euler angles have singularities. For the XYZ-angles these singularities lie at the vertical direction, where the yaw and the roll line up. Near these angles, numerical round off errors increase greatly. These drawbacks make the choice for Euler angles not very appealing.

Another way of representing rotations is using quaternions [18,19]. Quaternions are in essence four-dimensional complex numbers using i, j and k as the complex operators:

$$q = +ib + jc + kd$$

Because of the way quaternion algebra is defined, they are very useful to express orientation. For this purpose, quaternions are often written as a vector:

$$q = [a\ b\ c\ d]$$

Each rotation has a unique quaternion of unit length to describe it, which is defined by the axis of rotation (vector) and the angle of rotation around this axis. The defined quaternion for rotation row-vector $\phi$ is:

$$q = \left[\cos\frac{\alpha}{2}\ u\sin\frac{\alpha}{2}\right] \text{ with } \alpha = |\varphi| \text{ and } u = \frac{\varphi^T}{|\varphi|}$$

To rotate an arbitrary row-vector v using a quaternion, the vector is first written as a quaternion with a=0. Hereafter, it is transformed using quaternion multiplication:

$$q_v 32\ [0\ v^T]$$

$$q_{v,rotated} = q q_v q^{-1}$$

The quaternion multiplication in this equation is defined as:

$$q_0 q_1 = \begin{bmatrix} a_0 a_1 - b_0 b_1 - c_0 c_1 - d_0 d_1 \\ a_0 b_1 + b_0 a_1 + c_0 d_1 - d_0 c_1 \\ a_0 c_1 - b_0 d_1 + c_0 a_1 + d_0 b_1 \\ a_0 d_1 + b_0 c_1 - c_0 b_1 + d_0 a_1 \end{bmatrix}^T \text{ with } \begin{array}{l} q_0 = [\ a_0\ b_0\ c_0\ d_0\ ] \\ q_1 = [\ a_1\ b_1\ c_1\ d_1\ ] \end{array}$$

The inverse of a unit quaternion is equal to its conjugate, which is defined as:

$$q = [a\ b\ c\ d] \Rightarrow q^* = [a\ -b\ -c\ -d]$$

Every motion can be described as a sequence of rotations. As concatenating rotations described as quaternions corresponds to quaternion multiplication, the total rotation quaternion is calculated as follows:

$$q_{total} = q_n \cdots q_1 q_0$$

Example 4

Attitude Propagation from Angular Velocity

The angular velocity can be considered as an instantaneous rotation vector equal to $\omega(t)dt$. Because the signals are processed digitally and are therefore sampled with a finite sample time, an approximation to this instantaneous rotation vector needs to be made. The most simple one is a zero-order approximation, which approximates the signal as having a constant value during each sampling period:

$$v(n) = \omega(n)\Delta t$$

As rotations are not linear, linear integration of the angular velocity into a total rotation is not applicable. Instead, the angular velocity is propagated using quaternion multiplication as described earlier:

$$q_v(n) = \left[\cos\frac{|v(n)|}{2}\ \frac{v(n)}{|v(n)|}\sin\frac{|v(n)|}{2}\right]$$

$$q_r(n+1) = q_v(n)q_r(n)$$

Because the system is dealing with very small angular displacement, the absolute values of the angular velocity vector is often very small. Because the absolute values appear in the denominator of the equations, this can lead to numerical instabilities. As the angular displacements are very small, the first order Taylor-approximations of sine and cosine (sin(a)≈a and cos(a)≈1) can be used to build a more numerically stable system:

$$q_v(n) = \left[\cos\frac{|v(n)|}{2}\ \frac{v(n)}{|v(n)|}\sin\frac{|v(n)|}{2}\right] \approx \left[1\ \frac{1}{2}v(n)\right]$$

Because of round-off errors, concatenating rotations can cause the total rotation quaternion to lose unity. To prevent this situation, the quaternion is normalized after every each rotation.

Example 5

Transforming Acceleration to the Inertial Frame

When the rotation is known at each point in time, the acceleration vectors can be transformed to the world frame (any orthonormal frame with the z-axis lined up with the gravity vector).

By propagating the gyro signal to an orientation, a quaternion has been derived that describes the rotation from world frame to body frame. As all rotations need to be done from body frame to world frame, the inverse quaternion is used (which is equal to its conjugate):

$$q_{body}^{world}(n) = [q_{world}^{body}(n)]'$$

This makes the transformation equation equal to:

$$q_a^{(world)} = q_{body}^{world}(n) q_n^{(body)} q_{world}^{body}(n) \text{ with}$$
$$q_a^{(body)} = [0\ (a^{(body)})^T]$$

$$q_a^{(world)} = [0\ (a^{world})^T]$$

Example 6

Detecting Zero Velocity

Zero velocities can be detected by checking if acceleration and angular rate signals stay within a certain threshold [11]. By setting a certain minimum duration of this situation, a robust criterion for zero velocity is formed. The signals that are used are the magnitudes of acceleration and angular rate vectors. They contain all the information of the signals to be able to apply a threshold and the acceleration magnitude is easily compensated for gravity:

$$a_{magnitude} = \|\vec{a}\| - 9.8065$$

$$g_{magnitude} = \|\vec{g}\|$$

The solution presented here uses two counters for zero update control. One counter (ZUPT counter) is increased when all of the signals are below the threshold and decreased when they are not (with a minimum of 0). This counter is used to determine the likelihood of the zero velocity. Another counter (summation counter) is used to count the amount of samples that meet the zero-velocity criterion are encountered during the period of zero velocity.

A Zero-Velocity Update (ZUPT) is a method of estimating system parameters during brief periods of time where the gyroscopes and accelerometers are at rest. With the sensor mounted on the foot, this is basically when the foot is stationary on the ground (e.g. after each step while moving, standing still). The most important purpose of the zero-velocity update is resetting the velocity in the acceleration integrator to zero. This makes sure that any bias in the acceleration signal is not propagated into the position by the double integration very much. By modeling the excess velocity as an integrated constant bias, the excess position that is measured can be modeled as:

$$p_{excess} = \frac{1}{2} v_{excess} \Delta t_{int},$$

where $\Delta t_{int}$ is the integration time since the last ZUPT.

By using this value to correct the position estimate, the velocity error is back-propagated into the position and its influence on the final position estimate is heavily diminished. Of course, the constant bias approximation is not entirely accurate as non-linear orientation errors also cause an extra velocity to occur. It is however a reasonable best guess approximation, without introducing a complicated bias filter that models these non-linear relationships.

Example 7

Determining Orientation

As is the case with 2D attitude estimation, 3D attitude estimation also suffers from drift, caused by noise and bias. Estimating the orientation in three dimensions from the criterion that the velocities at the beginning of the step and at the end of the step are zero is however not feasible as multiple solutions to the minimization problem are bound to exist in 3D.

During a period of zero velocity, the acceleration is also zero. The only acceleration that is measured during this period is therefore the "artificial" acceleration caused by the gravity. This gravity vector is measured in the body-fixed frame and should correspond to the z-axis in the world frame. This property can be used to derive a rotation, which corrects the gyro drift by adjusting the estimated orientation to line up with the gravity vector.

The measured gravity vector can be described as:

$$e_z^{(body)} = \frac{\tilde{a}^{(body)}}{\|\tilde{a}^{(body)}\|} \bigg|_{n=0}$$

To determine the difference in orientation, the z-axis in the world frame needs to be transformed to the body frame. This can be done using the following quaternion transformation:

$$q_z^{(body)} = q_{world}^{body}(n) q_z^{(world)} q_{body}^{world}(n) \text{ with}$$
$$q_z^{(world)} = [0\ 0\ 0\ -1]$$

$$q_z^{(body)} = [0\ e_z^{(body)}]$$

Now both the measured and calculated gravity vectors are in the body frame, a rotation quaternion can be derived by determining the axis and angle of rotation using the scalar and vector product:

$$r = \tilde{e}_z \times e_z$$

$$\alpha = \tilde{e}_z \cdot e_z$$

$$q_g^{(body)} = \left[\cos\frac{\alpha}{2}\ \ r\sin\frac{\alpha}{2}\right]$$

Figure 20:
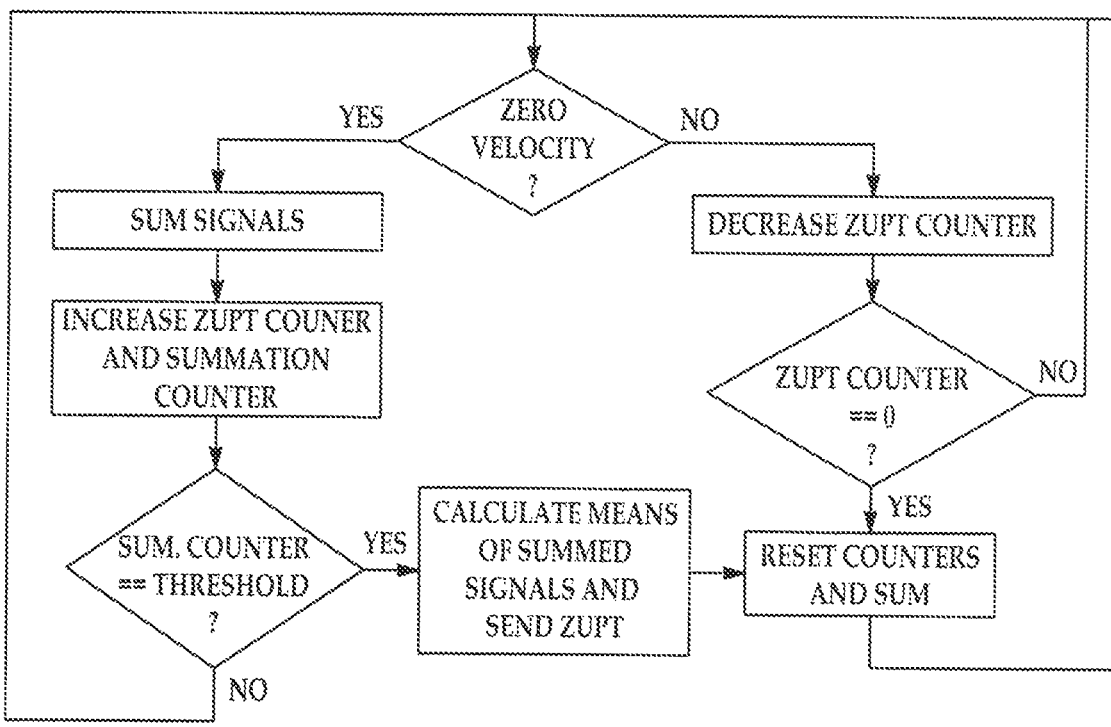
FIG. 20 is a schematic of a ZUPT algorithm.

By applying this rotation to the orientation estimated by the gyroscopes, it corrects this orientation by rotating the vector using the shortest path to the measured vector. This method does not effect the estimated yaw, as the axis of rotation is always perpendicular to the gravity vector and therefore the z-axis in the world frame. If the summation counter reaches a certain threshold, a ZUPT is sent back to the processor, which contains estimates for the values of the acceleration signals and the angular rate signals. To make the estimation of the signal values robust, the signal values determined during the zero-updates are computed as the mean of several measurements by summing all the signal values when the criterion is met and dividing these summed values by the summation counter. As more measurements are available during the zero-velocity period, the more reliable the update will be. FIG. 20 is a schematic of a ZUPT algorithm.

Figure 21:
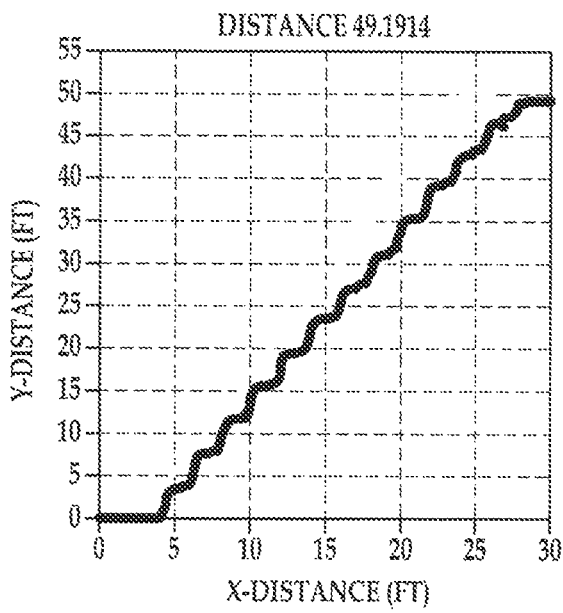
FIG. 21 is plots of distance for various straightforward walks.
Figure 21:
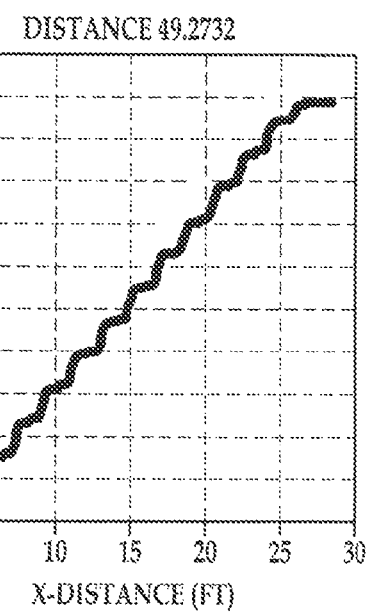
Figure 21:
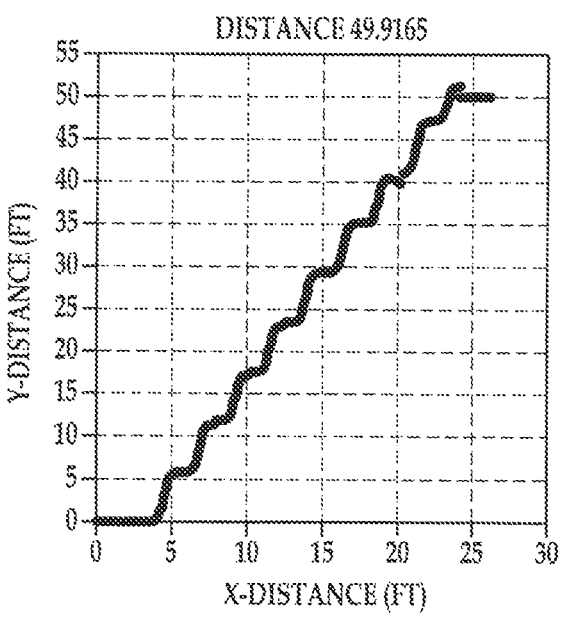
Figure 21:
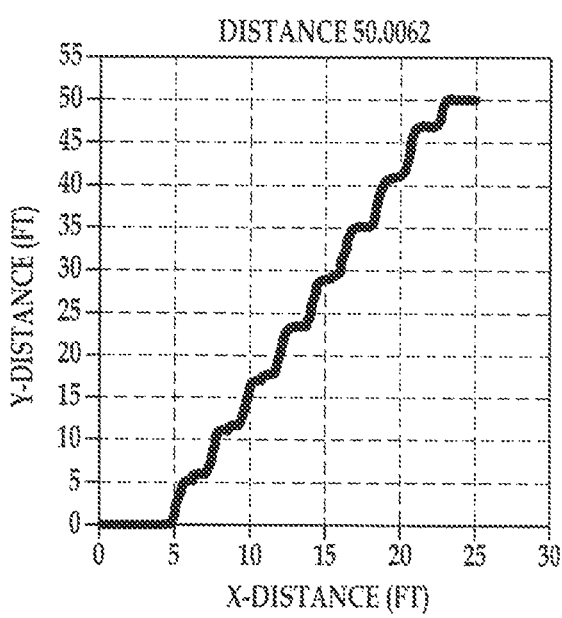

The system is evaluated using several measurements across a straight line with a length of approximately 50 feet. The system is tested with walks with different step sizes to assure the validity of the measurements. The chosen step sizes are 2 feet, 2.5 feet and 3 feet, which correspond to what feels like a stroll, a regular walk, and a heavy paced walk. Each walk is repeated three times. The results of a fully functional system are shown in FIG. 21. The error seems to be around 2%.

TABLE 1

| | Errors in distance estimation | | |
|---|---|---|---|
| Step size | Walk 1 | Walk 2 | Walk 3 |
| 2 feet | −1.62% | −1.46% | −2.20% |
| 2.5 feet | −2.40% | −1.80% | −1.28% |
| 3 feet | −2.16% | −1.98% | −2.56% |

Example 8

Hardware Description

The main components on the PCB are:
MMA7260QT 3-axis accelerometer
LISY300AL single axis gyroscope
LPR530AL dual axis gyroscope
HMR3100 single axis gyroscope
PIC18F6722 microcontroller
TXM-900-HP3 SPO transmitter Transmission Protocol Between Sensor and PC Because all of the processing is done externally, the board is required to send all of its values as raw data over the available channel. All of the sensor outputs described above add up to ten distinct signals.

Channel Protocol

The transmission over the RF-channel is done using a serial protocol defined by the RS-232 standard. For this purpose, the microcontroller contains a USART, which is directly connected to a RF-transmitter.

The configuration of this protocol is as follows:
Baud rate: 38400 bps
Stop bits: 1
Parity bits: 0
Flow control: None Packet Layout Each time a sample is generated, a packet is sent. All of the sent packets contain 18 bytes and have the same layout, which consists of:
Header:
8-bit start byte
8-bit time stamp
Data section:
16-bit accelerometer value $a_x$
16-bit accelerometer value $a_y$
16-bit accelerometer value $a_z$
16-bit angular rate value $g_x$
16-bit angular rate value $g_y$
16-bit angular rate value $g_z$
16-bit gyroscope value cp A 16-byte packet with a baud rate of 38400 results in a maximum packet frequency of 240 packets/s. Because the channel consists of a RF transmission, the channel is influenced by noise. This calls for error detection and correction methods, which are described in the section below.

Start Byte

The start byte of each packet has the decimal value of 128, which corresponds to the most significant bit in the byte. All of the other sent bytes do not have this bit set, and the start byte can therefore uniquely identified.

Timestamp

The timestamp is an 8-bit value which is increased by 1 every time a packet is sent. This makes it possible for the receiving software to recognize dropped packets and act upon this accordingly.

Data Values

The data values comprise the most important part of the packet. Every data value consists of a 10 bit value which is spaced into two bytes as follows:
Least significant byte

| | Bit nr: | | | | | | |
|---|---|---|---|---|---|---|---|
| 7 | 6 | 5 | 4 | 3 | 2 | 1 | 0 |
| Value bit: 0 | bit 6 | bit 5 | bit 4 | bit 3 | bit 2 | bit 1 | bit 0 |

Most significant byte

| | Bit nr: | | | | | | |
|---|---|---|---|---|---|---|---|
| 15 | 14 | 13 | 12 | 11 | 10 | 9 | 8 |
| Value bit: 0 | p3 | p2 | p1 | p0 | bit 9 | bit 8 | bit 7 |

As described earlier, the most significant byte of each byte is 0 to make it clearly distinguishable from a start byte. Bit locations 11 through 14 are filled with parity checking bits, generated by a Hamming encoder which will be explained in the upcoming section.

Error Detection and Correction Algorithm

Because of the communication over an RF channel, bit errors occur. Because the data values are only ten bits wide, 4 bits are available for redundancy purposes. As the Hamming-10,4 code can provide full single-bit error redundancy, this seems like a good choice for filling up the additional bits.

The Hamming-10,4 code consists of 10 data bits and 4 parity bits. It constructs the parity bits as independent linear combinations of the data bits distributed in a way where every data bit is protected by two or three parity bits. In this particular case, the following encoding table is used:

| | Bit nr: | | | | | | | | | |
|---|---|---|---|---|---|---|---|---|---|---|
| | 0 | 1 | 2 | 3 | 4 | 5 | 6 | 7 | 8 | 9 |
| p1 | x | x | | x | x | | x | | x | |
| p2 | x | | x | x | | x | x | | x | x |
| p3 | | x | x | x | | | | x | | x |
| p4 | | | | | x | x | x | x | x | x |

If a data bit is now flipped by the channel, it corresponds to a unique parity error vector with two or three bits set. If a parity bit is flipped, it corresponds to a parity error vector with one bit set. The results are unpredictable if two bits are accidentally flipped and the algorithm will fail in this case.

Sensor Board Software

Figure 1:
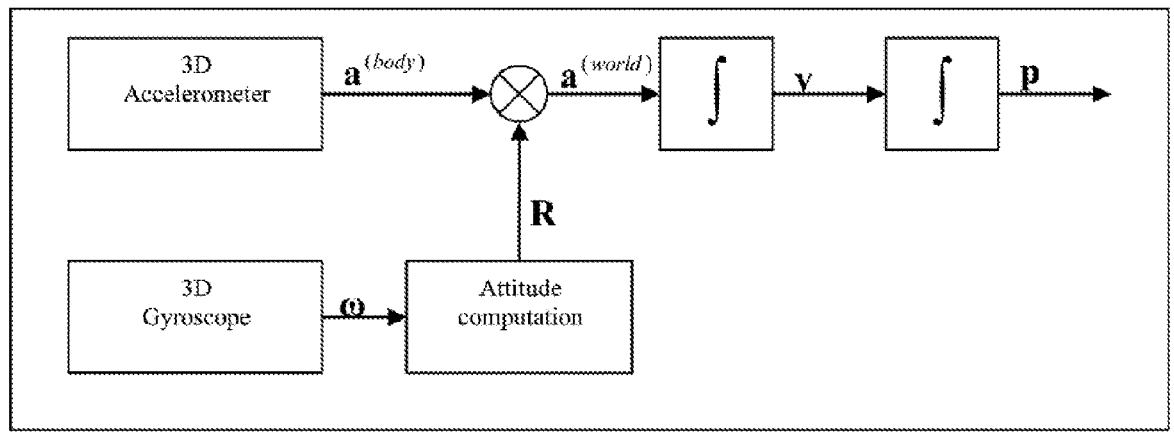
FIG. 1 is a prior art schematic of classical PDR navigation.
Figure 2:
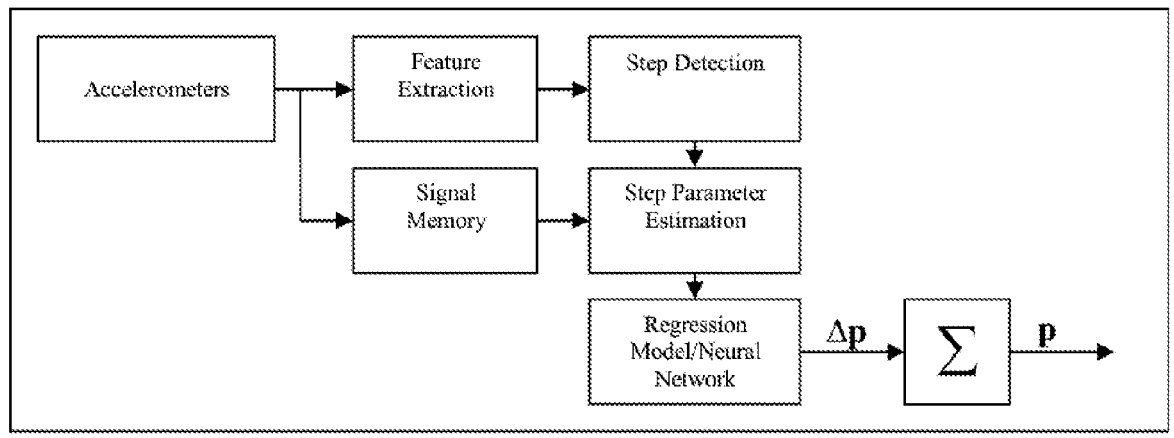
FIG. 2 is a prior art schematic of regressive PDR.
Figure 3:
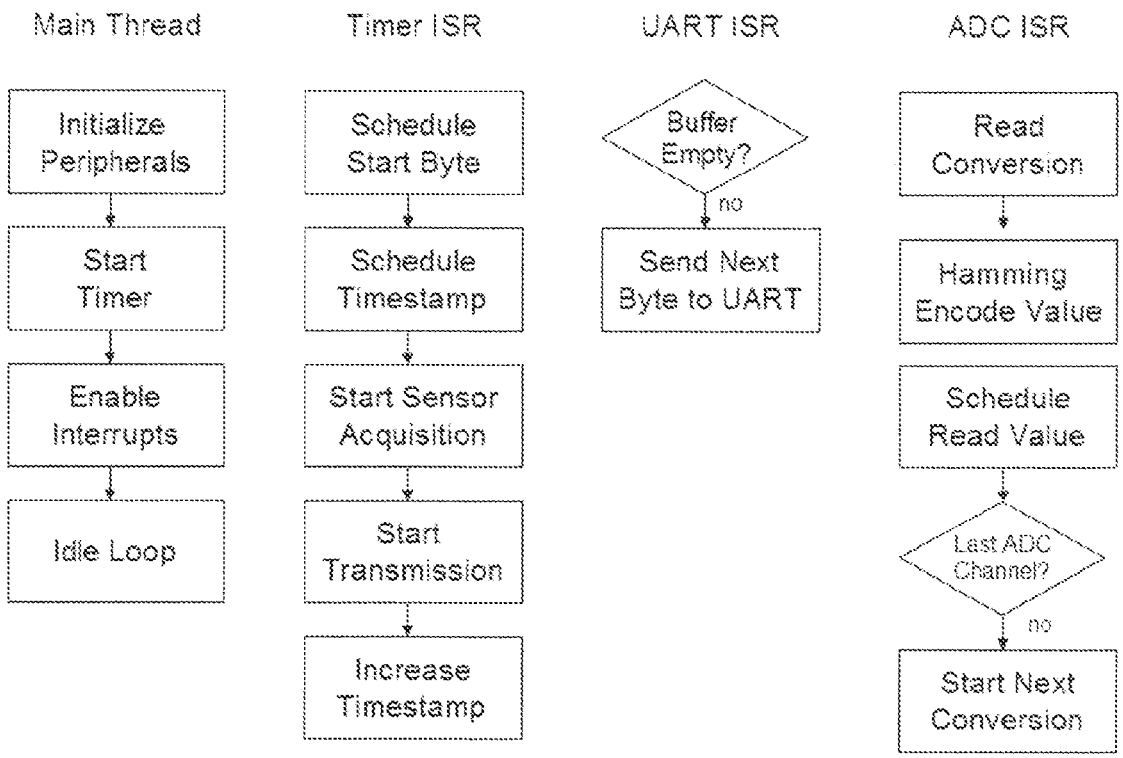
FIG. 3 is a schematic of inventive system software.
Figure 4:
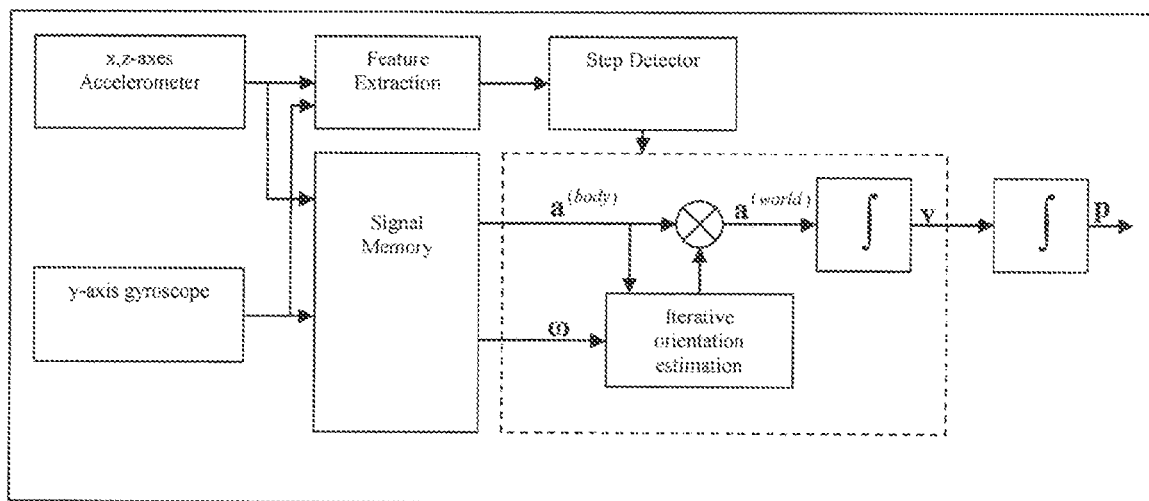
FIG. 4 is a schematic of topology for 2D processing.
Figure 9A:
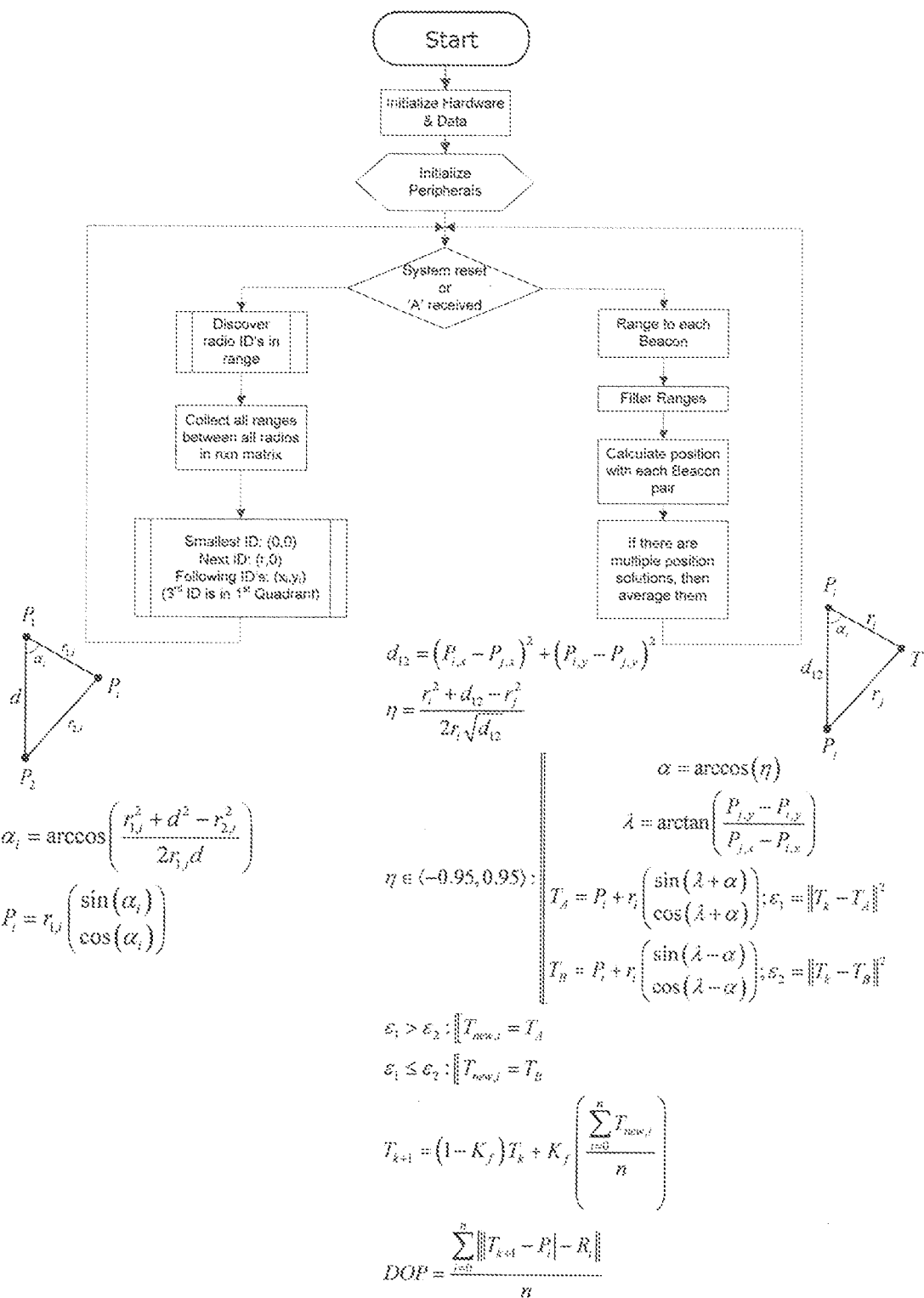
FIG. 9A is an inventive system schematic using individual RF range measurements combined with inertial sensor based measurements.
Figure 9B:
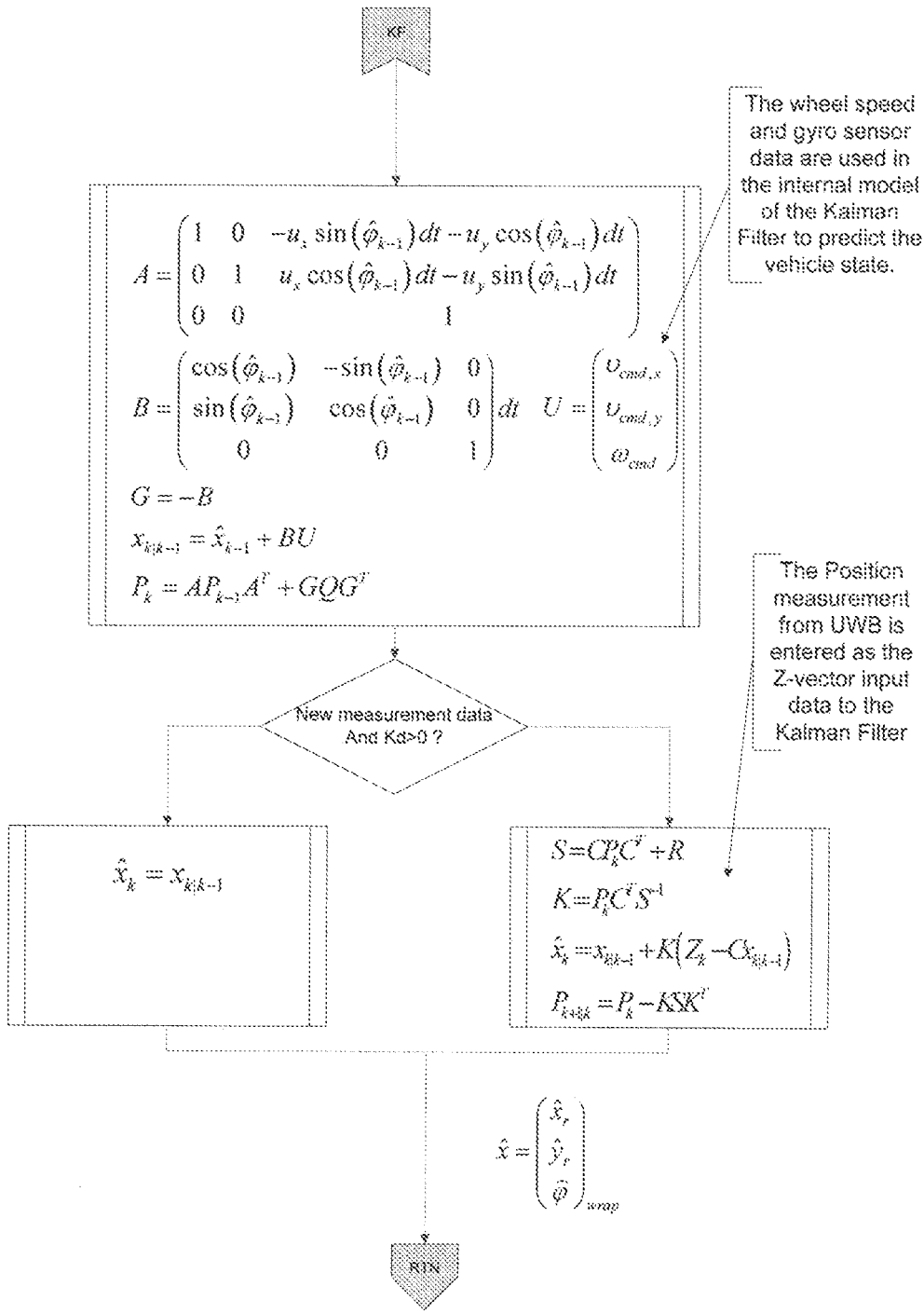
FIG. 9B is a schematic of an extended Kalman filter used to fuse inertial sensor information and RF-based range/positioning information.

The sensor software has been developed in C and is suitable to run on the PIC18F6722 microcontroller. Its functionality involves:
Timing the sensor sampling
Reading the ADC channels
Formatting data packets
Sending the data to the USART The software is optionally completely interrupt driven, which leaves room for additional on chip processing of the data. A global flow diagram of the timing is shown in FIG. 9A. The software consists of 4 different threads, as shown in FIG. 3.

Main Thread

The main thread is responsible for initialization of the peripherals and configures the AD-converter and the UART for data acquisition and reception. The main thread also initializes the timer, which is responsible for timing of the sampling. After the initialization sequence, the main thread goes idle in an endless loop. This loop can be used for future processing. The main loop is regularly interrupted by the interrupt routines of the timer, UART and ADC peripherals, which are described next.

Timer ISR

The timer interrupt-service routine is triggered several times each sampling period. Each time the timer ISR is triggered, a counter is increased. If this counter reaches a certain value, the rest of the ISR is executed and the counter is reset. This counter is therefore responsible for the sample time.

The timer ISR first schedules a start-byte and a timestamp for transmission. It then starts the first AD-conversion and starts the transmission of the first byte. The rest of the acquisition and communication is controlled by the UART and ADC interrupt service routines.

UART ISR

The UART interrupt service routine is executed when a byte has been transmitted and the buffer is ready to send a new byte. The routine looks if there is a byte scheduled for transmission in the buffer and sends this byte to the serial communication port. If there is no byte in the buffer, the transmission is ended and the UART ISR is not invoked until the next time the Timer ISR is executed.

ADC ISR

The ADC interrupt service routine is invoked when an AD-conversion has been completed. The routine reads the value of the conversion from the appropriate registers, adds redundancy using the Hamming encoder and schedules the result for transmission. If the end of the channel list is not reached, it starts a new AD-conversion on the next channel in line. If the end of the channel list is reached, the sequence of conversions is ended and will not start again until the next time the timer ISR is invoked.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention,

REFERENCES

[1] Widyawan, Martin Klepal, Stéphane Beauregard, "A Backtracking Particle Filter for Fusing Building Plans with PDR Displacement Estimates," *Positioning, Navigation and Communication*, 2008. WPNC 2008. 5th Workshop, pp, 207-212, 27-27, March 2008.

[2] Stéphane Beauregard, "A Helmet-Mounted Pedestrian Dead Reckoning System," in proceedings of 3*rd International Forum on Applied Wearable Computing*, 2006.

[3] Jeong Win Kim, Han Jin Jang, Dong-Hwan Hvvang, Chansik Park, "A Step, Stride and Heading Determination for the Pedestrian Navigation System," *J. Global Positioning Syst.*, vol, 3, no, 1-2, pp. 273-279, 2004.

[4] Quentin Ladetto, Bertrand Merminod, "An Alternative Approach to Vision Techniques: Pedestrian Navigation System Based on Digital Magnetic Gyroscope and Gyroscope Integration", in *6th World Multiconfirence on Systemics, Cybernetics and Information*, Orlando, USA, 2002.

[5] Edith Pulido Herrera, Ricardo Quirós, Hannes Kaufmann, "Analysis of a Kalman Approach for a Pedestrian Position System in Indoor Environments", In *Proceedings of the European Conference on Parallel and Distributed Computing* (Euro-Par 2007), 2007.

[6] Oliver Woodman, Robert Harle, "Pedestrian Localisation for Indoor Environments", *UbiComp* '08, September 21-24, Seoul Korea, 2008.

[7] G. Retscher, "An Intelligent Multi-sensor System for Pedestrian Navigation", Journal of Global Positioning Systems, Vol. 5, No. 1-2: 110-118, 2006.

[8] Alexander Kleiner, Dali Sun, "Decentralized SLAM for Pedestrians Without Direct Communication",

[9] Oleg Mezentsev, Gerard Lachapelle, "Pedestrian Dead Reckoning—A Solution to Navigation in GPS Signal Degraded Areas?", Geomatica, Vol. 59, No. 2, pp. 175-182, 2005.

[10] Damien Kubrak, "Hybridisation of a GPS Receiver with Low-Cost Sensors for Personal Positioning in Urban Environment," Master Thesis, May 2007.

[11] Eric Foxlin, "Pedestrian Tracking with Shoe-Mounted Inertial Sensors", 2005.

[12] Eric Foxlin, "Inertial Head-Tracker Sensor Fusion by a Complementary Separate-Bias Kalman Filter", 1996.

[13] Seon-Woo Lee, Kenji Mase, "Recognition of Walking Behaviors for Pedestrian Navigation", *Proceedings of 2001 IEEE Conference on Control*, 2001.

[14] Quentin Ladetto, "On Foot Navigation: Continuous Step Calibration Using Both Complementary Recursive Prediction and Adaptive Kalman Filtering", *ION GPS*, Salt Lalce City, Utah, September 19-22, 200.

[15] Stéphane Beauregard, Herald Haas, "Pedestrian Dead Reckoning: A Basis for Personal Positioning," in *Proceedings of the 3rd Workshop on Positioning, Navigation and Communication*, 2006.

[17] Lauro Ojeda, Johann Borenstein, "Personal Dead-reckoning System for GPS-denied Environments," *IEEE International Workshop on Safety, Security, and Rescue Robotics*, Rome, Italy, Sep. 27-29, 2007.

[18] Byung-Uk Lee, "Stereo Matching of Skull Landmarks", 1991.

[19] Nikolas Trawny, Stergios I. Roumeliotis, "Indirect Kalman Filter for 3D Attitude Estimation, A Tutorial for Quaternion Algebra," *Technical Report, Multiple Autonomous Robotic Systems Laboratory*, University of Minnesota, 2005.

The invention claimed is:

1. A subject location tracking process comprising:

communicating radiofrequency signals from a radiofrequency sensory integration module with a remote RF transceiver beacon, said radiofrequency sensory integration module forming a system with an ankle mounted inertial tracking module and a microprocessor, and operative without line of sight with said remote RF transceiver beacon;

determining a measured range between said radiofrequency sensory integration module and said beacon with software in said radiofrequency sensory integration module;

accessing a database of known positions for the beacon to estimate a predicted range;

computing an error value between the measured range and the predicted range, or between said radiofrequency signals and a predicted range, wherein positional data as to location of the system from said inertial tracking module is used to compute the predicted range;

communicating a corrected position to said inertial tracking module to aid in resetting or correcting an orientation value or a velocity values as generated by an inertial module sensor within said inertial tracking module;

adding a weighing factor to the measured range based on the error prior to determining the location data for the subject by trilaterating the location of the subject target;

determining location data of the subject with said microprocessor and displaying the location; and wherein said microprocessor processes sets of data being generated in tandem by said radiofrequency sensory integration module and an inertial sensor in said inertial tracking module to form a mutually corrective system.

2. The process of claim 1 wherein said inertial module sensor provides acceleration values for the subject.

3. The process of claim 2 wherein the acceleration values are transformed into orientation values and then velocity values.

4. The process of claim 1 wherein the beacon conveys the location data.

5. The process of claim 1 wherein the location data is displayed to the subject.

6. The process of claim 1 wherein said inertial module sensor is at least one of a gyroscope and an accelerometer.

7. A subject location tracking process comprising:

communicating radiofrequency signals from a radiofrequency sensory integration module with a plurality of remote RF transceiver beacons, said radiofrequency sensory integration module forming a system with an ankle mounted inertial tracking module and a microprocessor, and operative without line of sight with said plurality of remote RF transceiver beacons;

determining a measured range between said radiofrequency sensory integration module and said plurality of beacons with software in said radiofrequency sensory integration module;

accessing a database of known positions for the beacon to estimate a predicted range;

computing an error value between the measured range and a predicted range, or between said radiofrequency signals and the predicted range, wherein positional data as to location and orientation of the system from said inertial tracking module is used to compute the predicted range;

communicating a corrected position to said inertial tracking module to aid in resetting or correcting an orientation value or a velocity values as generated by an inertial module sensor within said inertial tracking module;

adding a weighing factor to the measured range based on the error prior to determining the location data for the subject; by trilaterating the location of the subject target;

determining location data of the subject with said a microprocessor and displaying the location; and wherein said microprocessor processes sets of data being generated in tandem by said radiofrequency sensory integration module and an inertial sensor in said inertial tracking module to form a mutually corrective system.

8. The process of claim 7 wherein said inertial module sensor provides acceleration values for the subject.

9. The process of claim 8 wherein the acceleration values are transformed into orientation values and then velocity values.

10. The process of claim 7 wherein the location data is displayed to the subject.

11. The process of claim 7 wherein said inertial module sensor is at least one of a gyroscope and an accelerometer.

12. The process of claim 1 further comprising said inertial module sensor is amenable to mounting on a waist, torso, or head of an animate subject and any portion on an inanimate subject that is coupled to a periodic movement during translation.

13. The process of claim 1 wherein said inertial module sensor are a 2D accelerometer and a single axis gyroscope that are arranged to model said subject's navigation as a 2D problem by approximating the subject's leg movement as being a motion that is constrained to the x,z-plane.

14. The process of claim 13 wherein a set of signals coming from said inertial module sensor are first stored in a signal memory, while features of the signals are identified that can be used for step detection by a step detector; and wherein said step detector determines the beginning and end of a step, which is used to retrieve acceleration and gyro signals during the step from the signal memory for further processing.

15. The process of claim 14 wherein said processing further comprises first an estimation of an orientation of said inertial module sensor with respect to a world frame, said orientation estimation being based on an assumption that the velocity at the beginning of the step and the end of the step is equal to zero; and wherein the calculated orientations are used to transform the acceleration signals from a body-frame to the world frame and doubly integrated to update the position of said subject.

* * * * *